United States Patent
Ventosa et al.

(10) Patent No.: US 7,754,777 B2
(45) Date of Patent: Jul. 13, 2010

(54) METHOD FOR OBTAINING MICRO- AND NANO-DISPERSE SYSTEMS

(75) Inventors: Nora Ventosa, Bellaterra (ES); Jaume Veciana, Bellaterra (ES); Santiago Sala, Bellaterra (ES); Mary Cano, Bellaterra (ES)

(73) Assignee: Sociedad Espanola De Carburos Metalicos, S.A., Barcelona (ES)

( * ) Notice: Subject to any disclaimer, the term of this patent is extended or adjusted under 35 U.S.C. 154(b) by 0 days.

(21) Appl. No.: 11/569,151

(22) PCT Filed: Jan. 3, 2006

(86) PCT No.: PCT/IB2006/000086

§ 371 (c)(1),
(2), (4) Date: Nov. 15, 2006

(87) PCT Pub. No.: WO2006/079889

PCT Pub. Date: Aug. 3, 2006

(65) Prior Publication Data

US 2007/0259971 A1    Nov. 8, 2007

(30) Foreign Application Priority Data

Jan. 31, 2005   (ES)   ................. 200500172

(51) Int. Cl.
*B01D 12/00* (2006.01)
(52) U.S. Cl. ............ 516/198; 264/11; 264/12; 516/110
(58) Field of Classification Search ............. 516/110
See application file for complete search history.

(56) References Cited

U.S. PATENT DOCUMENTS

| | | | |
|---|---|---|---|
| 5,145,684 A | 9/1992 | Liversidge et al. | |
| 5,554,382 A | 9/1996 | Castor | |
| 5,858,410 A | 1/1999 | Muller et al. | |
| 6,074,441 A | 6/2000 | Schulte et al. | |
| 6,177,103 B1 * | 1/2001 | Pace et al. | 424/489 |
| 7,291,295 B2 * | 11/2007 | Ventosa Rull et al. | 264/5 |
| 2003/0047824 A1 * | 3/2003 | Hanna et al. | 264/11 |
| 2004/0026319 A1 * | 2/2004 | Chattopadhyay et al. | 210/634 |

FOREIGN PATENT DOCUMENTS

| | | |
|---|---|---|
| ES | 2 165 888 | 6/1996 |
| ES | 2 170 008 | 7/2002 |
| WO | WO 97/14407 | 4/1997 |
| WO | WO 99/65469 | 12/1999 |
| WO | WO 01/24917 | 4/2001 |
| WO | WO 02/09422 A1 | 1/2002 |
| WO | WO 03/030871 A1 | 4/2003 |
| WO | WO 2004/056443 | 7/2004 |

OTHER PUBLICATIONS

Ventosa N. et al.: DELOS Process: A Crystallization T . . . Journal of Supercritical Fluids, PRA Press, US, vol. 26, No. 1, May 2003, pp. 33-45, XP004418672, ISSN: 0896-8446.

* cited by examiner

*Primary Examiner*—Ling-Siu Choi
*Assistant Examiner*—Chun-Cheng Wang
(74) *Attorney, Agent, or Firm*—Cozen O'Connor

(57) ABSTRACT

The invention relates to a method for obtaining micro- and nanodisperse systems. In particular, it relates to a method that allows said systems, such as liposomes, emulsions and suspensions, to be obtained with a size of less than 50 µm, and preferably less than 1 µm, and with improved stability properties over time, which includes the stages of a) Dissolving or suspending a compound C in a fluid A, to obtain a mixture AC, in the form of a solution or dispersion; b) Thermostatising said mixture AC to a temperature of between −50° C. and 200° C.; c) Adding a fluid B to mixture AC until a pressure P is obtained; and it is characterised in that in said stage (c) formation of the solution AB occurs and because it includes, d) Reducing the pressure of solution AB to a pressure lower than or equal to 100 bars, and then e) Adding a fluid E, in which fluid A is miscible and in which compound C is partially or totally insoluble at atmospheric pressure, with said fluid E acting as a crystallisation interruption agent.

17 Claims, 19 Drawing Sheets

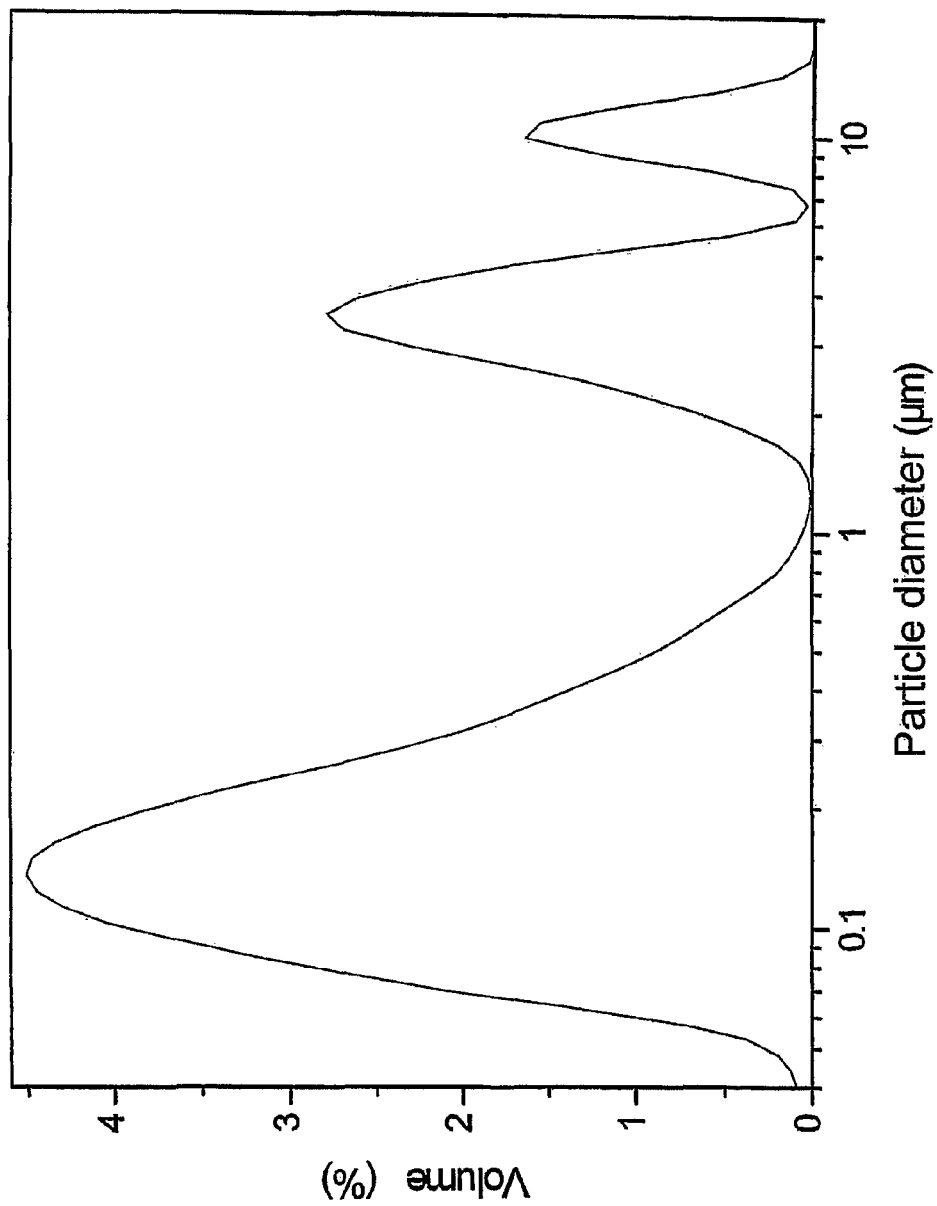

METHOD FOR OBTAINING MICRO- AND NANO-DISPERSE SYSTEMS

FIELD OF THE INVENTION

The present invention relates to a method for obtaining micro- and nanodisperse systems. In particular, the present invention relates to a method that permits said systems, such as liposomes, emulsions and suspensions, to be obtained with a size lower than 50 μm and with improved stability properties over time.

Advantageously, the method of the present invention provides micro- and nanodisperse systems with a size lower than 1 μm.

BACKGROUND OF THE INVENTION

A large number of industrial sectors use or produce products that are supplied as heterogeneous liquid formulations, in which more than one phase exists. The properties and the added value of these disperse systems largely depends on their physico-chemical characteristics: the nature of the various phases present, degree of dispersion of one phase in the other, composition of the system, stability of the system over time, etc. The liposomes, emulsions and suspensions are important heterogeneous liquid formulations with a wide range of applications, e.g. additives and coatings, foodstuffs, drugs and cosmetics. In particular, liposomes are small spherical vesicle made up of a lipid bilayer that encloses an aqueous nucleus. Emulsions are systems made up of small drops of liquid dispersed in another liquid with which they are not miscible, and suspensions are systems formed by solid particles dispersed in a fluid.

Obtaining micro- and nanodisperse systems, such as micro- and nanoliposomes, micro- and nanoemulsions, micro- and nanosuspensions, would help increase the added value of end products in many industrial sectors, e.g. printing inks, cosmetics, powdered paints, drugs, coatings, etc. The obtaining of nanosuspensions of solid substances with high therapeutic activity but with low water solubility is of considerable interest to the pharmaceutical sector, since it would allow said substances to be administered intravenously or transdermally. It would also involve greatly increased stability of such disperse systems over time.

U.S. Pat. No. 5,145,684 uses the "pearl milling" technique for milling suspensions in water with surfactant in order to provide stable nanosuspensions.

U.S. Pat. No. 5,858,410 discloses a method of breakdown in suspension based on cavitation forces obtained at high pressure, using surfactants.

Application WO9965469 discloses a method in which a rapid expansion of a solution of the compound to be suspended is carried out in a supercritical fluid (RESS method) over an aqueous solution. Surfactants can be used in both the supercritical gas phase and the aqueous phase.

Application WO9714407 discloses a method related with the RESS method. In brief, it describes the preparation of disperse systems by depressurizing a solution of the compound to be suspended in a supercritical fluid without surfactant, carried out over water with surfactant.

Application WO02/09422A2 describes a method for obtaining nanosuspensions by precipitation from a solution, owing to the anti-solvent effect of the dispersant fluid (fluid E) on the latter.

At present, all the methods of preparation of micro- and nanodisperse systems are complex and consume large amounts of energy, since they either require many stages or they must be carried out at high pressure, such as pressures exceeding 100 bar. Thus exists considerable interest in research into and development and application of eco-efficient methods of obtaining micro- and nanodisperse systems.

DETAILED DESCRIPTION OF THE INVENTION

The object of the present invention is to provide a method for obtaining micro- and nanodisperse systems with a particle size generally lower than 1 μm, which requires fewer processing stages, no need to use sophisticated apparatus and can be carried out under softer conditions, especially as regards pressure.

The present invention thus relates to a method of obtaining micro- and nanodisperse systems that includes the following stages:

a) Dissolving or suspending a compound C in a fluid A, in order to obtain a mixture AC, in the form of a solution or dispersion;

b) Thermostatising said mixture AC at a temperature of between −50° C. and 200° C.; preferably between 10° C. and 70° C.; more preferably still between 20° C. and 50° C;

c) Adding a fluid B to the mixture AC until a pressure P is obtained, while either the mixture AC or the fluid B can initially or indistinctly be under pressure;

and is characterised in that in said stage (c) a solution AB is formed, optionally with solids in suspension, and in that it includes thereafter:

d) Reducing the pressure of the solution AB to a pressure lower than or equal to 100 bars, preferably lower than or equal to 20 bars, and more preferably still lower than or equal to 1 bar, giving rise to a fall in temperature that is ideally homogeneous throughout the mixture that gives rise to an increase of supersaturation, such that the compound C separates out in the form of a solid or liquid of micro-, submicro- or nanoscopic size; and then, e) Adding a fluid E, in which fluid A is miscible and in which compound C is partially or totally insoluble at atmospheric pressure, further acting said fluid E as a crystallisation interruption agent.

Preferably, said fluid A and/or said fluid E contain at least one additive.

The disperse phases of the systems thus obtained present a narrow volumetric distribution of sizes and a mean associated sphere diameter of less than 50 μm, generally less than 1 μm, preferably less than 500 nm, more preferably less than 200 nm, and more preferably still less than 100 nm (see FIG. 1).*

The size of the disperse phase of the systems obtained in accordance with the method of the present invention depends mainly on the magnitude and speed of the temperature drop, the concentration of compound C in the solution AB, the nature and concentration of the additives that can be added to fluid A and/or E and of the concentration ratio between additives and compound C. Accordingly, the greater the temperature drop the smaller the size of the disperse phase will be; the greater the speed of the temperature drop, the smaller the size and distribution of sizes of the disperse phase, and the greater the concentration of compound C in the solution AB the smaller the size of the particles of the disperse phase.

In the method of the invention, the separation of compound C from the solution AB to form a new phase is due to the rapid and ideally homogeneous considerable fall in the temperature of the solution AB that arises during its depressurisation. The temperature drop implies a great increase in the supersaturation of compound C, ideally homogeneous throughout the solution.

This temperature drop of the solution AB is caused by the evaporation of fluid B. The evaporation of fluid B occurs with the same intensity at all points of the solution AB, thereby ensuring an ideally homogeneous temperature drop throughout the solution and an ideally homogeneous increase of the supersaturation of the solution, thus permitting a uniform disperse phase size to be achieved.

Definitions

In this invention:

Compound C is taken to mean a substance or mixture of solid or liquid substances, chosen from a drug, explosive, colorant, pigment, cosmetic, polymer, catalyst, chemical product for agriculture or other substance partially or totally insoluble in fluid E, and liable to be dispersed in a phase that includes fluid E and fluid A. Compound C is soluble in the mixture of fluid A and fluid B to give the solution AB at pressure P and temperature T.

Fluid A is taken to mean any polar or apolar solvent or a mixture of both that is miscible with fluid B at pressure P and miscible with fluid E (for example, ethanol as fluid A and water as fluid E) at atmospheric pressure. Preferably, said fluid A can be chosen from the group that includes acetone, water, methanol, ethanol, ethyl acetate, toluene or mixture thereof. Preferably, said fluid A contains at least one additive. Optionally, said fluid A may contain a solid phase, with that solid phase being preferably in the form of particles, which particles would more preferably be in suspension in said fluid A.

Fluid B is taken to mean any fluid which at pressure P is in a liquid or supercritical state, such as $CO_2$, ethane, propane, hydrochlorofluorocarbons (such as CFC-22) or hydrofluorocarbons (such as HFC-134A) which on the one hand behave as such at pressure P and temperature T, while on the other hand are moreover gases at atmospheric pressure and ambient temperature and axe miscible with fluid A and/or with mixture AC, at a certain pressure P and temperature T, with the aim of obtaining solution AB.

Fluid E is taken to mean any polar or apolar solvent or a mixture thereof which is miscible with fluid A. Compound C must be partially or totally insoluble in fluid E at atmospheric pressure. Preferably, said Fluid E contains at least one additive. Said fluid B can act as a sudden interrupter of crystallisation.

To enable the carrying out of the method of the present invention, the rapid and homogeneous temperature drop undergone by the solution AB that contains compound C upon being depressurised has to involve a reduction of at least one order of magnitude in the solubility of compound C in solvent A.

In a preferred embodiment, the fluid A remaining in the dispersion resulting from the stage (e) is removed by separation, for example by means of evaporation, In another embodiment of the method of the invention, said fluid A and/or fluid E include at least one additive, said additive being preferably chosen from among emulsifiers, surfactant agents, surface agents stabilisers and colloid protectors, and more preferably from among the polysorbates, polyethylene glycols (PEGS), poloxamer, ascorbil palmitate, lecithin, hexacetyltrimethylammonium bromide (CTAB), dioctyl sodium sulphosuccinate (AOT), together with other ionic and nonionic surfactants.

Advantageously, said additive plays a role in the stability of the final dispersion and can also take part in nucleation and crystalline growth, helping to achieve still smaller particle sizes and narrower size distributions.

The electrostatic interactions between particles, on which the stability of a disperse system depends, are determined by measuring the potential Z.

By measuring the potential Z, it has been observed that the dispersions obtained in accordance with the method of the present invention have a stability 60% greater than those obtained by means of the prior state of the art, generally 30% higher.

Advantageously, an inert gas is fed into the mixing reactor in order to maintain the pressure P and temperature T conditions during depressurisation in stage d).

In this invention, "inert gas" is taken to mean any gas that does not interfere in the solubility of compound C in the solvent mixture made up of fluid A and fluid B. Among the most widely used are nitrogen, helium and argon.

In accordance with the method of the invention, the solubility behaviour of compound C in mixtures of fluid A and fluid B, at pressure P and temperature T, can approximate to a mathematical function of the type shown below.

The variation of solubility of compound C with solvent composition ($X_B$=moles B/(moles B+moles A)) pressure P and temperature T, in the range $X_B$=[0, 1], can be described by means of a function of the type:

$$S = S^A \cdot (1-X_B)^{(\alpha+\beta X_B)} + S^B X_B \qquad \text{Equation 1}$$

where S is the solubility of compound C, expressed in moles of C per moles of solvent, $X_B$ is the molar fraction of fluid B in the solvent mixture (fluid A plus fluid B), i.e. $X_B$=moles B/(moles B+moles A), at pressure P and temperature T; $S^A$ is the solubility of compound C in fluid A and $S^B$ is the solubility of compound C in fluid B. The coefficients $\alpha$ and $\beta$ of the Equation 1 describe the variation of S in relation to $X_B$, with $X_B$ being a value lying between 0 and 1.

The yield Of the method is in function of the solubility response of compound C in mixtures of fluid A and fluid B at pressure P and temperature T and, therefore, of the coefficients $\alpha$ and $\beta$ of said approximation that describes the variation of solubility with $X_B$.

Thus, a suitable solubility curve is obtained when $\alpha<1$, $\beta>0$ and $|\beta/\alpha| \geq 1$ is accomplished simultaneously (see FIG. 2); or when simultaneously $0 \leq \alpha \leq 1$ and $0 \leq \beta \leq 1$.

When $\alpha>1$, or $\beta<0$ the requirements for carrying out the method in accordance with the invention are not fulfilled (see FIG. 3). Nor is the solubility curve suitable when parameters $\alpha$ and $\beta$ of Equation 1 that describe it simultaneously fulfil $\alpha<0$, $\beta>0$ and $|\beta/\alpha|<1$.

It may be noted that, although an approximation has been made to a function that describes the solubility of a compound C in a solvent mixture, by means of a function such as that of Equation 1, such an approximation can clearly be carried out with other mathematical functions that can describe said solubility.

Moreover, the evolution of the composition of the "compound C- fluid A-fluid B" system, at pressure P and temperature T, is linear as $X_B$ increases and can be expressed by means of Equation 2.

$$[C] = -[C]^A X_B + [C]^A \qquad \text{Equation 2}$$

where $[C]^A$ is the initial concentration of compound C in fluid A.

When the initial concentration $[C]^A$ is lower than $S^A$ the intersection between the straight line shown by Equation 2 and the solubility curve described by means of Equation 1 must, in order to obtain an optimal result occur at a value of $X_B>0.2$, preferably $X_B>0.4$, with $X_B$ being the molar fraction of fluid B in the solvent mixture (fluid A+fluid B). (see FIG. 2).

As FIG. 3 shows, in mixture AC, in this case a solution, of concentration $[C]^A$ than $S^A$ at temperature T, "salting out" precipitation would occur before a sufficient amount of fluid B has been mixed with mixture AC to allow the method of the invention to be carried out.

When the initial concentration $[C]^A$ is greater than $S^A$ there must be a first intersection between the straight line shown by Equation 2 and the solubility curve described by Equation 1 at the value of $X_B>1$, preferably $X_B<0.9$, with $X_B$ being the molar fraction of fluid B in the solvent mixture (fluid A+fluid B), for the optimum case (see FIG. 4). In the case Of a second intersection between Equation 1 and Equation 2, at a value of $X_B$ higher than that of the first intersection said intersection must occur at values of $X_B>0.2$ preferably $X_B>0.4$, for the optimum case (see FIG. 5).

From $X_B>0.2$ good yields are obtained in the precipitation of compound C.

Advantages of the method of the present invention in relation to the state of the art a) In relation to the techniques described in U.S. Pat. No. 5,145,684:

In the method of the present invention the long processing times associated with the techniques described in the aforesaid patent are not required (which required times may be as much as days). Indeed, one advantageous aspect of the method of this invention is that obtaining the nano- and microdisperse systems does not depend on the processing time but on factors such as the magnitude and speed of the temperature drop during the depressurisation stage and the nature of the fluids used.

Furthermore, the milling techniques described in said document of prior art present problems of contamination of the product by abrasion, which cannot be tolerated in active formulations such as pharmaceuticals. Indeed, milling/grinding processes are not suitable for the production of nanodisperse systems with a narrow distribution of sizes, for as the particle size decreases progressively it is more difficult to use the mechanical energy applied in the form of cavitation and shear forces necessary in such techniques in order to reduce the size of the particles) without simultaneously inducing agglomeration of the particles.

There are also microbiological and degradation problems with heat-labile compounds that are overcome using the process of the present invention.

The method of the present invention overcomes the disadvantages set out above, for mechanical forces are not required in order to reach the desired particle size, work is carried out in an oxygen-free atmosphere and the temperature conditions are softer.

Another advantageous aspect of the method of present invention is that where compound C is a polymorphic product, a nanodisperse system of high polymorphic purity is achieved, so that there is no risk of an unwanted polymorphic transformation during the processing.

b) In relation to methods based on the "high-pressure homogenisation" technique:

In the process based on the "high-pressure homogenisation" technique work has to be carried out at pressures of at least 1500 bars, and several cycles are required in order to achieve the desired particle size, while in the process of the present invention, work is on the one hand carried out at pressures lower than 100 bars and, on the other hand, consists of one cycle only.

Furthermore, in the case of "high-pressure homgenisation" the size and quality of the resulting disperse system depends on the characteristics of the solid prior to processing, and it is necessary to start with a powder that is as fine as possible (taken from a "Jet-Milled process", for example).

In the process of the invention there is no such dependency, since the suspension is formed from a mixture (solution AB).

c) In relation to techniques for making nanosuspensions based on the precipitation of homogeneous systems.

These methods of making nanosuspensions are based on continuous-process micromixing of a solution A that contains a compound C and a fluid E. The flow of fluid E is very much higher than that of solution A. The fluid E is soluble in solvent A and acts as an anti-solvent on the compound C. On micromixing solution A with large quantities of fluid E, considerable supersaturation takes place along with the precipitation of compound C, which is left in the form of nanoparticles dispersed in fluid E.

In this method of prior art, the size and size distribution of the suspended phase largely depends on the efficiency of the mixing between fluid E and solution A. In other words, the size of the disperse phase depends on the supersaturation created during the mixing of A and E, with a high ratio of solution A/fluid E being required. As a consequence, the colloidal suspensions thus obtained are of very low concentration, since the proportion of fluid E in relation to solution A is very high, so that subsequent evaporation processes are necessary in order to achieve more concentrated suspensions.

Advantageously, in the method of the present invention the separation of phases occurs due to the great, rapid and extremely homogeneous cooling of solution AB upon depressurisation. This cooling provokes an ideally homogeneous increase in the supersaturation of the solution, and precipitation of the nanoparticles. In the process of the present invention the proportion between solution A and fluid B is not a determining factor in the size of the disperse phase. It is therefore possible using the process of the invention to achieve disperse systems of high concentration directly, without any need for subsequent solvent evaporation processes.

d) In relation to techniques based on compressed fluids

Document WO9965469 discloses a method in which rapid expansion of a solution of the compound to be suspended is carried out in a compressed fluid (RESS process) over an aqueous solution. Surfactants can be used both in the compressed-gas phase and in the aqueous phase. The pressures necessary for solubilising significant amounts of the product to be suspended in the liquefied gas are usually in excess of 200 bars and therefore also higher than the pressures used in the method of the present invention (lower than 100 bars).

Furthermore, in said document of prior art the water only acts as a means of dispersion of the particles formed during depressurisation of the compressed gas solution. In the method of she present invention, solvent B (water), in addition to acting as a means of dispersion also acts as an agent that sharply interrupts the phenomenon of crystallisation that is taking place during the depressurisation of solution AB. This action has a decisive influence in reducing the crystalline growth of the particles.

Furthermore, document WO9714407 describes the preparation of disperse systems by depressurisation of a solution of the compound to be suspended in a supercritical fluid without surfactant, implemented on water with surfactant. Moreover, it also includes the utilisation of the PCA method based on the precipitation by anti-solvent effect of supercritical fluid over a solution of a compound in a conventional solvent. More specifically, this solution is injected into a reactor that contains the supercritical fluid, leading to precipitation of the compound, and then collecting it and stabilising it in an aqueous solution with surfactant. The size of the disperse phase depends on the efficiency of mixing of the solution with the supercritical fluid.

In the present invention the size distribution of the disperse phase is determined by the temperature drop of solution AB during its depressurisation, which is ideally homogeneous, providing narrow size distributions.

One advantage of the method of the present invention is the utilization of pressure values lower than those of the preceding techniques. Another advantage is the possibility of incorporating an additive (e.g. a surfactant) into the solution AB that contains the compound to be processed. Moreover, in the method of the present invention the fluid E acts as a sudden interrupter of the crystallisation process.

Advantageously, the method of the present invention further permits micro- and nanodisperse systems of products with low solubility in supercritical fluids to be obtained.

Figure 1:
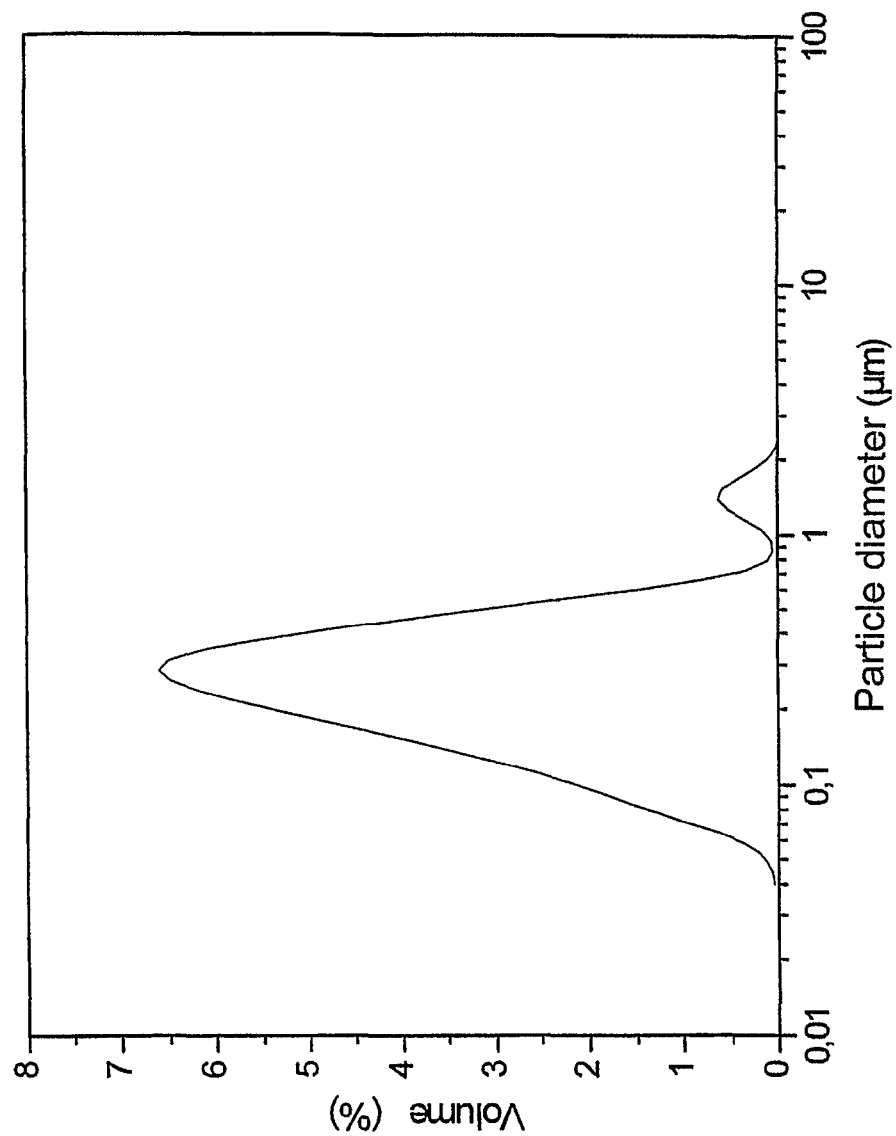
FIG. 1 shows the distribution of sizes of the disperse phase pertaining to a nanosuspension produced in accordance with the method of the invention.
Figure 2:
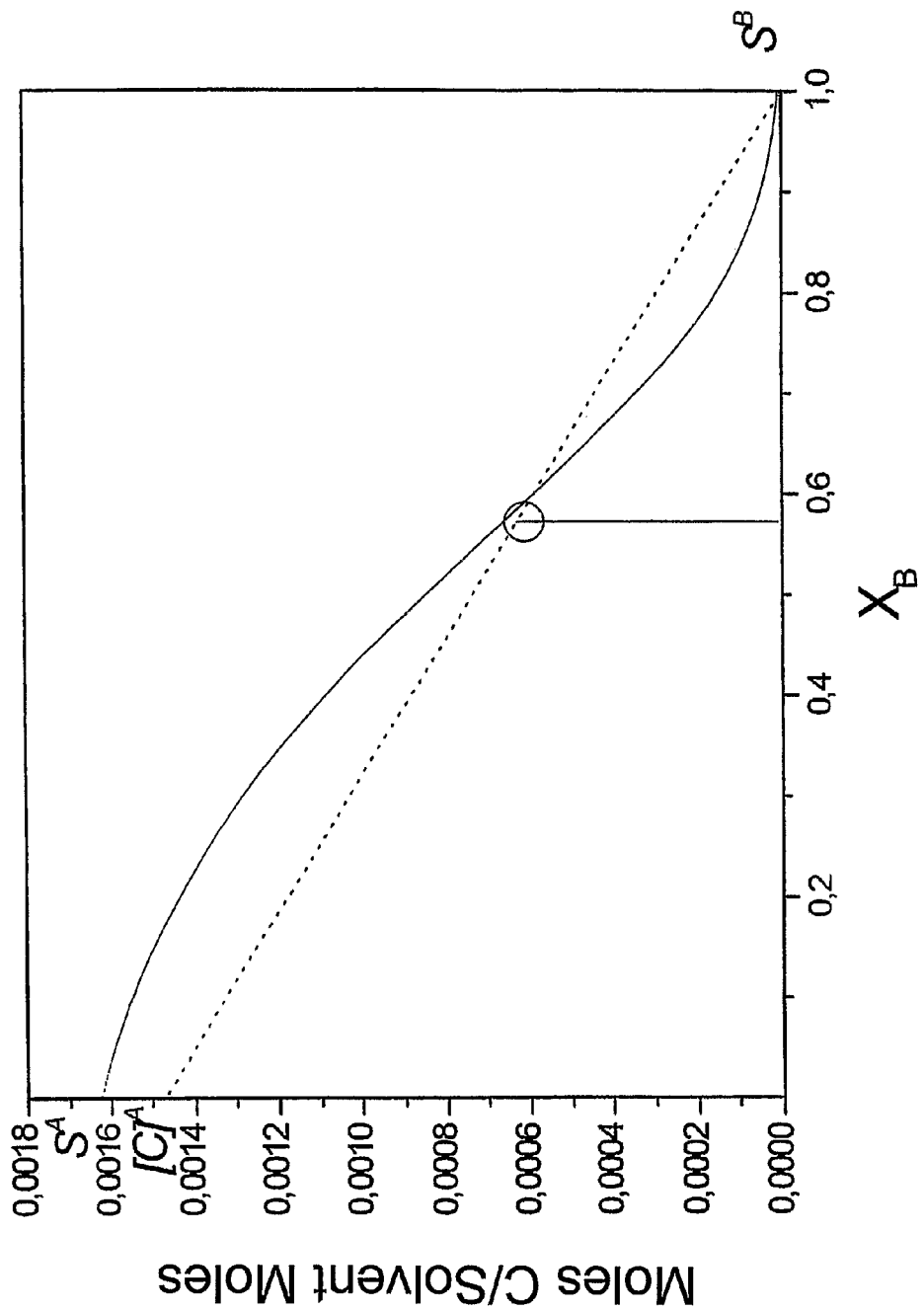
FIG. 2 shows the variation of the solubility (S; unbroken line) of a compound C with a solvent composition fluid A and fluid B), at pressure P and temperature T, with values of the coefficients of Equation 1 (in this case $\alpha<1$; $\beta>0$; $|\beta/\alpha|\geqq 1$) that permit the method in accordance with the invention to be carried out. Variation of the concentration of the compound C ([C], broken line) with addition of fluid B to the initial mixture AC, starting out from a value of $([C]^4<S^4)$.
Figure 3:
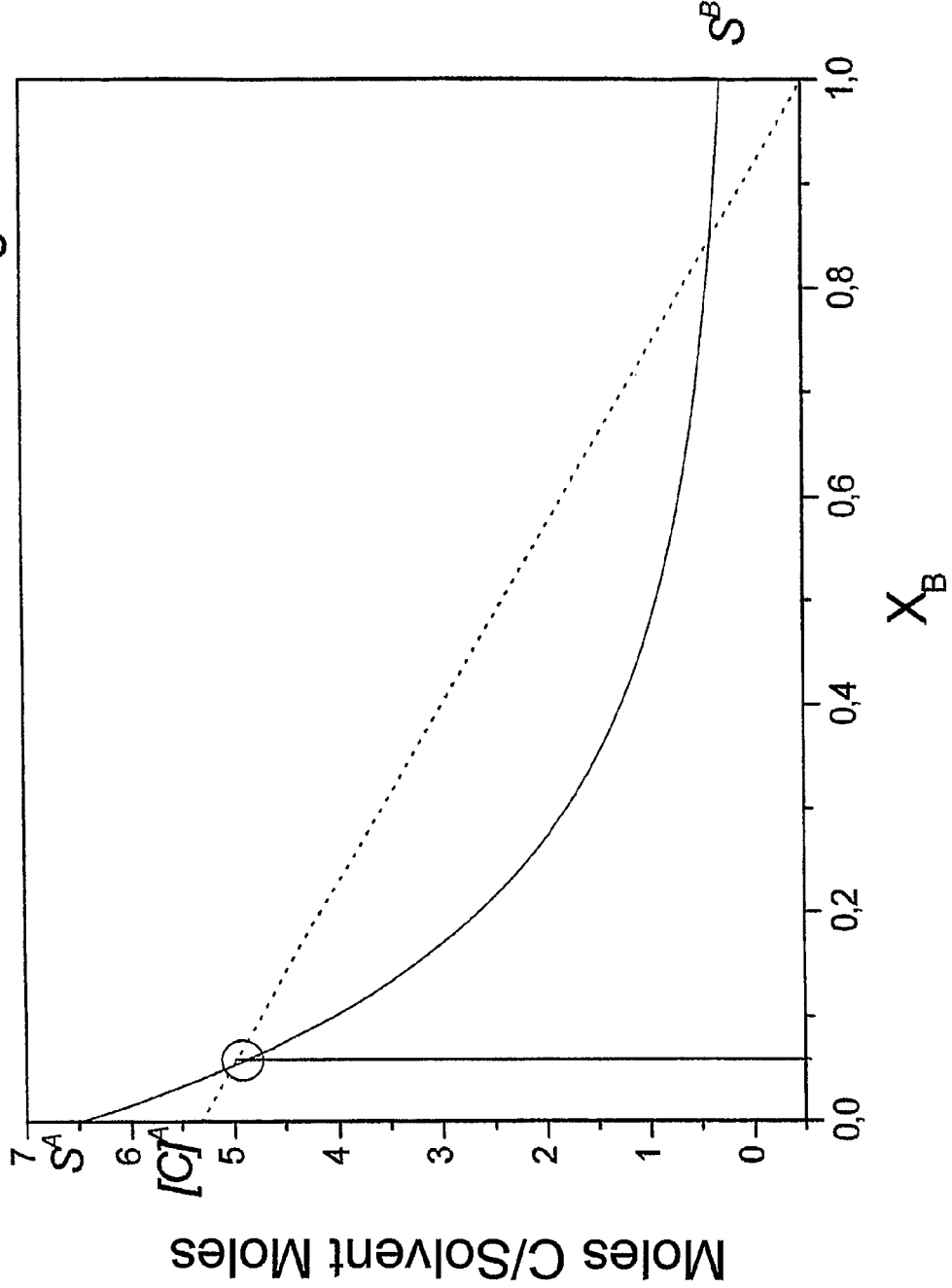
FIG. 3 shows the variation of the solubility (S; unbroken line) of a compound C with solvent composition (fluid A and fluid B), at pressure P and temperature T, with the values of the coefficients of Equation 1 (in this case $\alpha>1$) for which a method in accordance with the invention cannot be carried out. Variation of the concentration of the compound C ([C], broken line) with addition of fluid B to the initial mixture AC.
Figure 4:
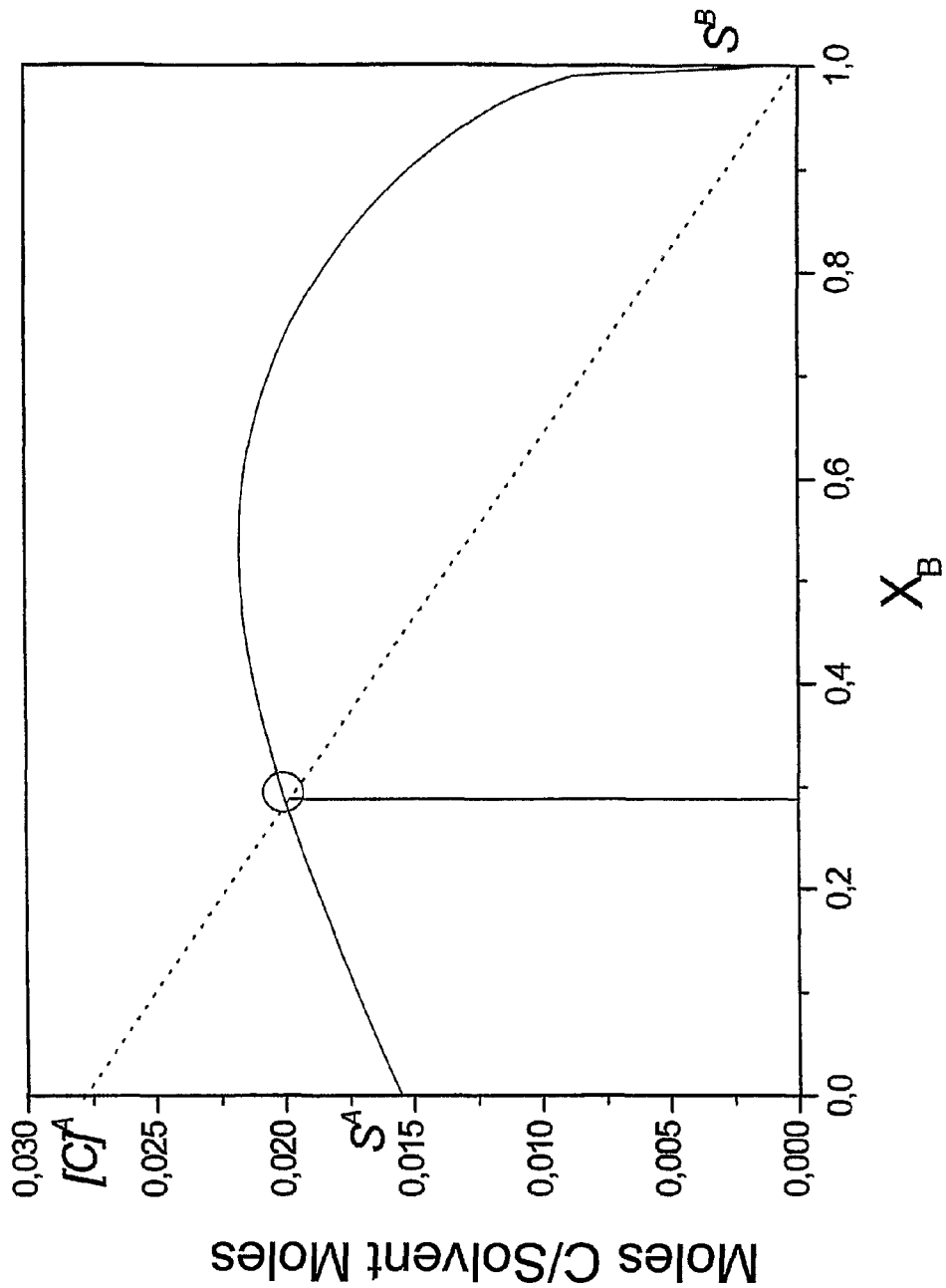
FIG. 4 shows the variation of the solubility (S; unbroken line) of a compound C with solvent composition (fluid A and fluid B), at pressure P and temperature T, with the values of the coefficients of Equation 1 (in this case $\alpha<1$; $\beta>0$; $|\beta/\alpha|\geqq 1$) which allow the method in accordance with the invention to be carried out. Variation of the concentration of the compound C ([C], broken line) with addition of fluid B to the initial mixture AC, starting out from a value of $([C]^4>S^4)$.
Figure 5:
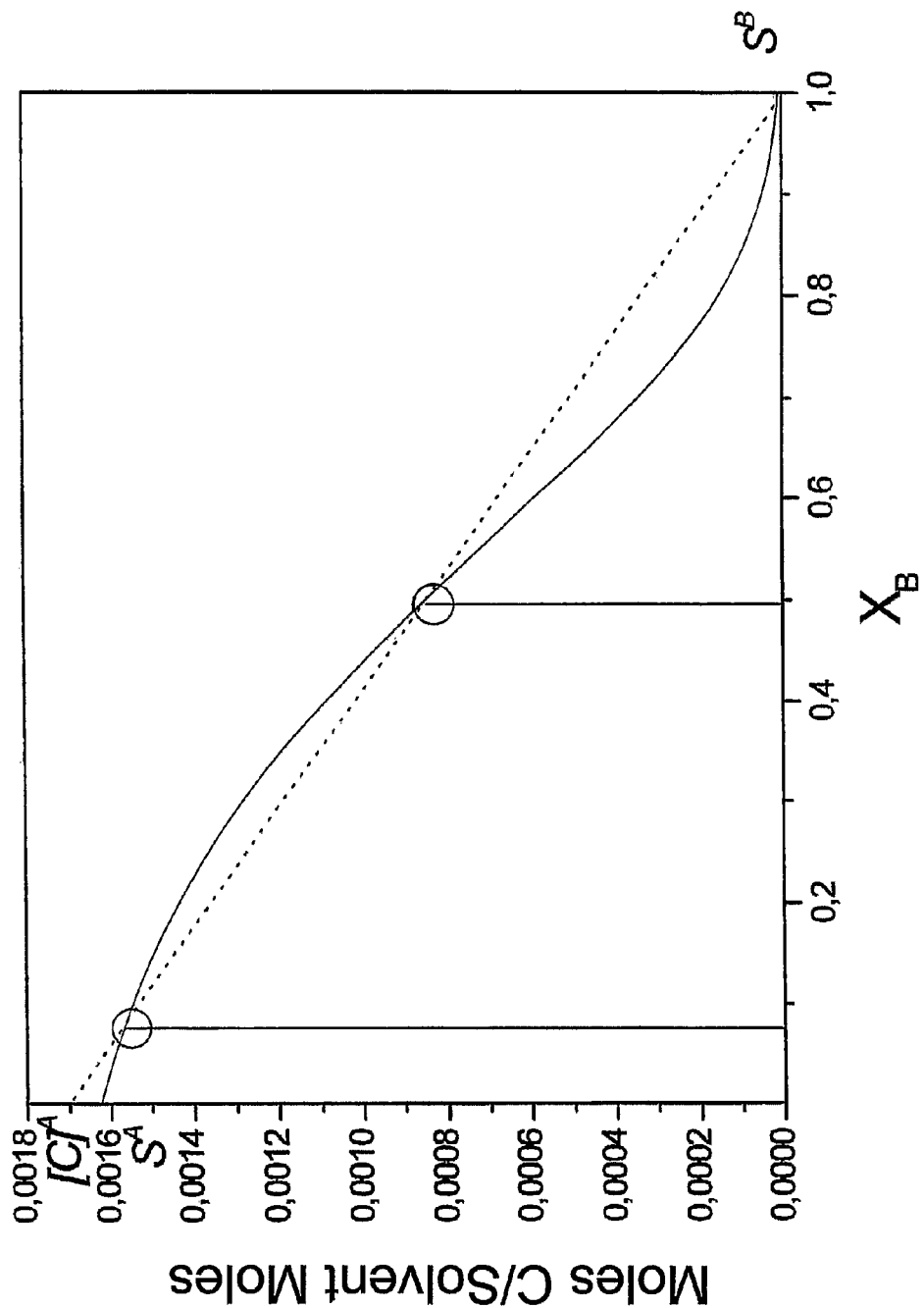
FIG. 5 shows the variation of the solubility (S; unbroken line) of a compound C with solvent composition (fluid A and fluid B), at pressure P and temperature T, with the values of the coefficients of Equation 1 (in this case $\alpha<1$; $\beta>0$; $|\beta/\alpha|\geqq 1$) which allow the method in accordance with the invention to be carried out. Variation of the concentration of the compound C ([C], broken line) with addition of fluid B to the initial mixture AC, starting out from a value of $([C]^4<S^2)$.

Said filter is not necessary for carrying out the method of the present invention, although its utilisation can be advantageous for the purpose of eliminating possible solid residues.

On emerging from the filter 11 and when it passes through value 12, the solution AB undergoes a rapid depressurisation, continuous-process mixing with a fluid E (which is in the tank 14) and is supplied by means of a pump 13, while the dispersion obtained is collected in the receptacle 15.

Figure 7:
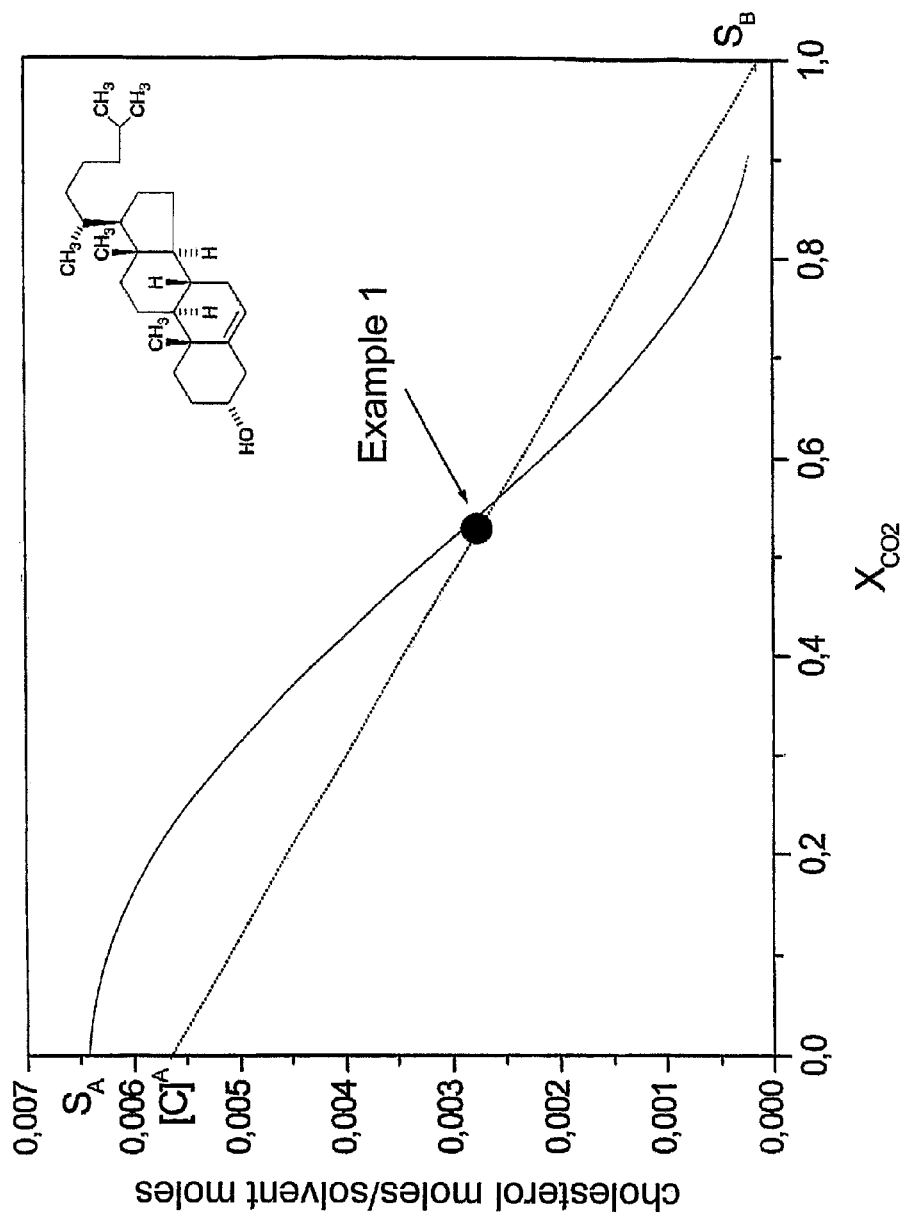

FIG. 7 shows the composition of the "cholesterol-acetone-$CO_2$" mixture at 100 bars and 35° C. just before depressurisation, example 1, in relation to the solubility curve of cholesterol in mixtures of acetone-$CO_2$ at 100 bars and 35° C. On adjusting the solubility curve shown in the Figure to Equation 1 the following values were obtained: $\alpha=0.1$; $\beta=1.9$.

Figure 8:
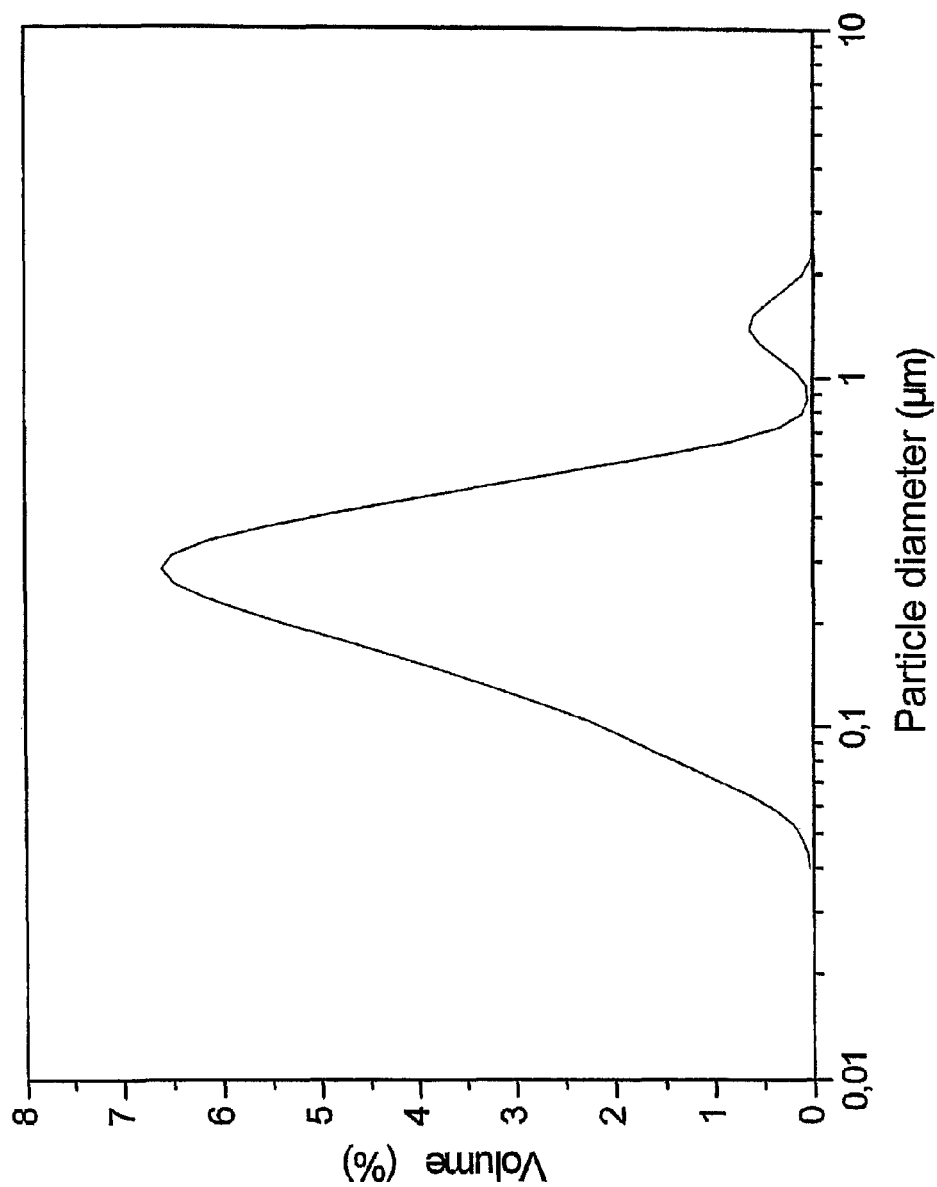

FIG. 8 pertains to analysis by laser dispersion technique of the distribution of sizes of the disperse phase of the suspension obtained in Example 1.

Figure 9:
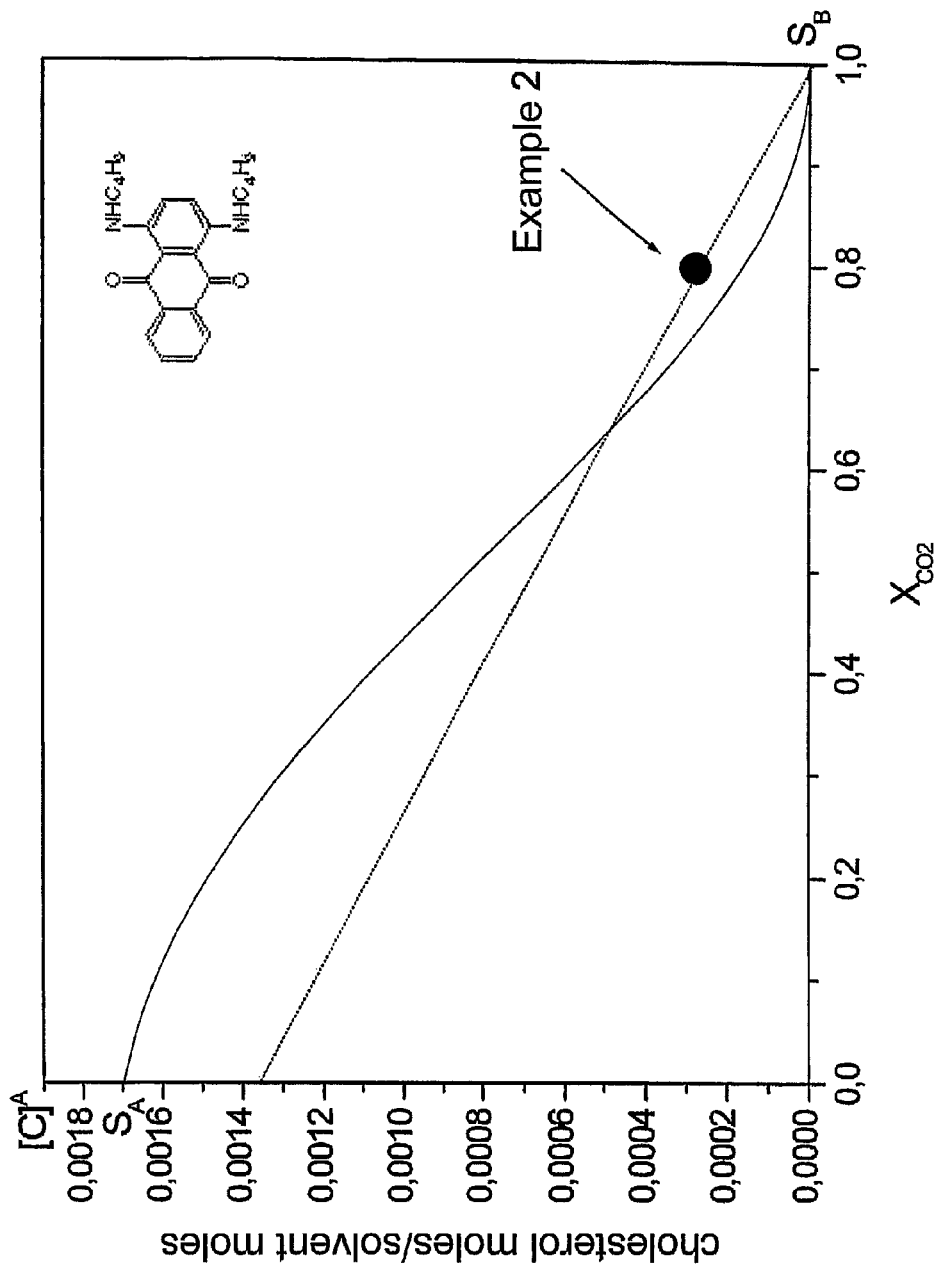

FIG. 9 shows the composition of the "solvent blue 35-acetone-$CO_2$" mixture at 100 bars and 25° C. just before depressurisation, Example 2, in relation to the solubility curve of "solvent blue 35" in mixtures of acetone-$CO_2$ at 100 bars and 25° C. On adjusting the solubility curve shown in the Figure to Equation 1 the following values were obtained: $\alpha=0.3$; $\beta=1.5$.

Figure 10:
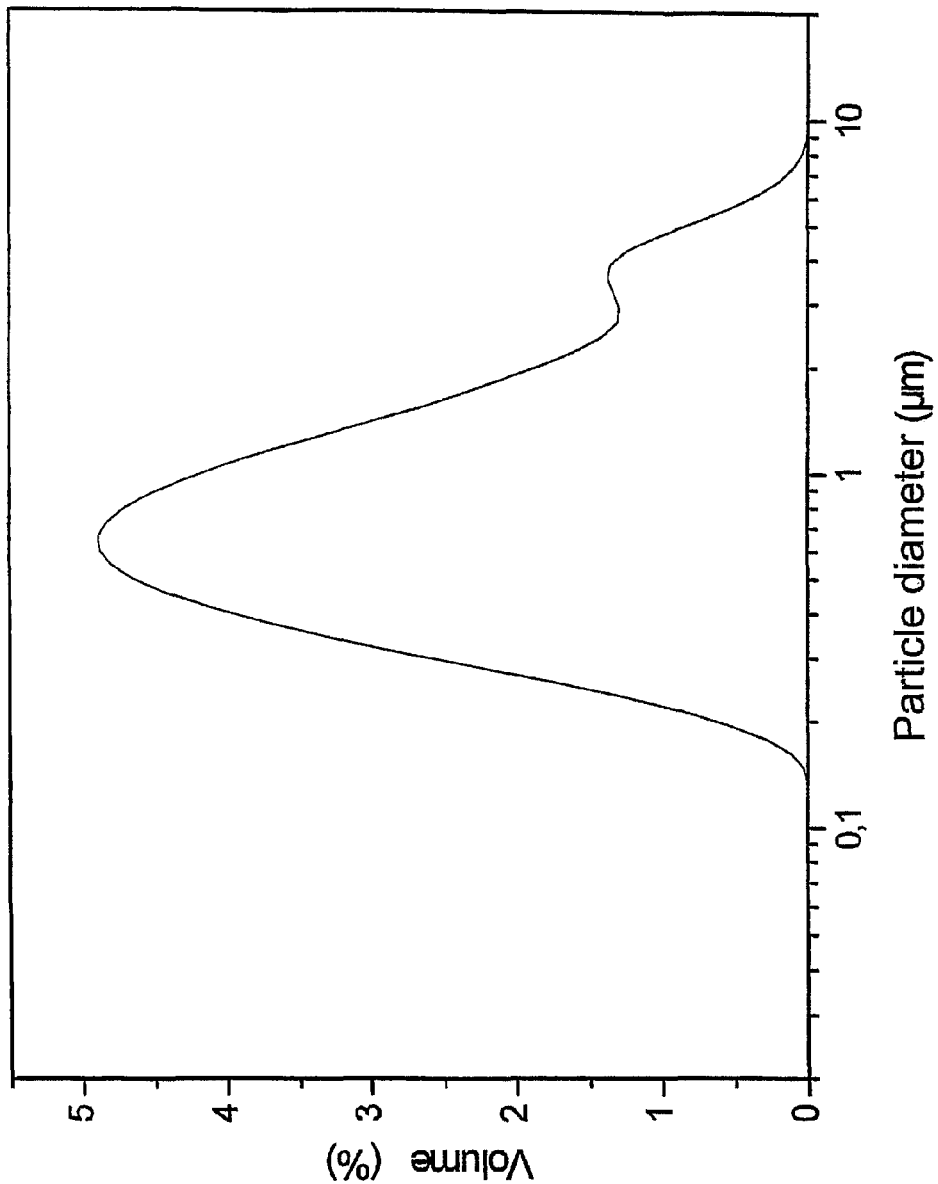

FIG. 10 pertains to the analysis by laser dispersion technique of the distribution of sizes of the disperse phase of the suspension obtained in Example 2.

Figure 11:
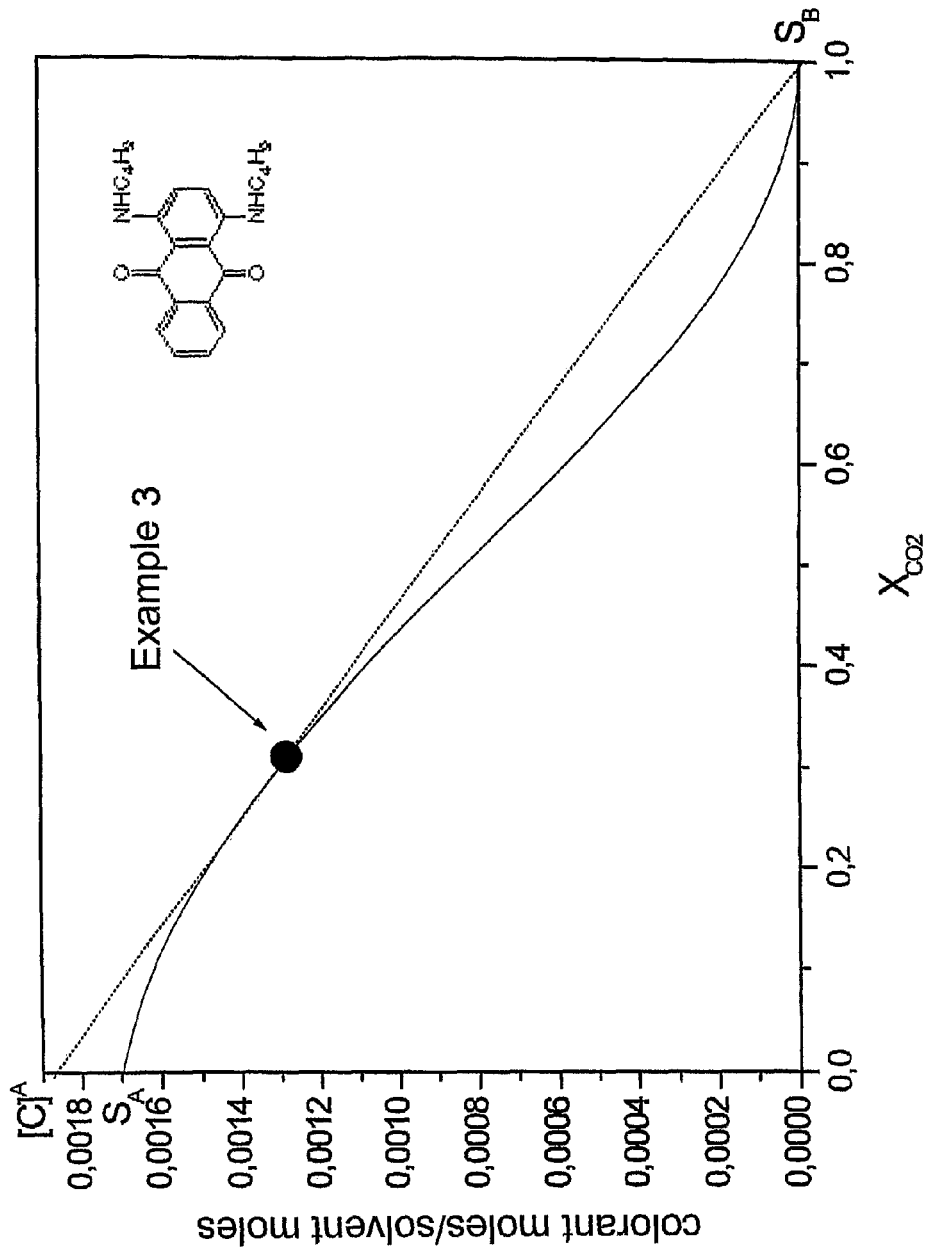

FIG. 11 shows the composition of the "solvent blue 35-acetone-$CO_2$" mixture at 100 bars and 25° C. just before depressurisation, Example 3, in relation tot he solubility curve of "solvent blue 35" in mixtures of acetone-$CO_2$ at 100 bars and 25° C. On adjusting the solubility curve shown in the Figure to Equation 1 the following values were obtained: $\alpha=0.3$; $\beta=1.5$.

Figure 12:
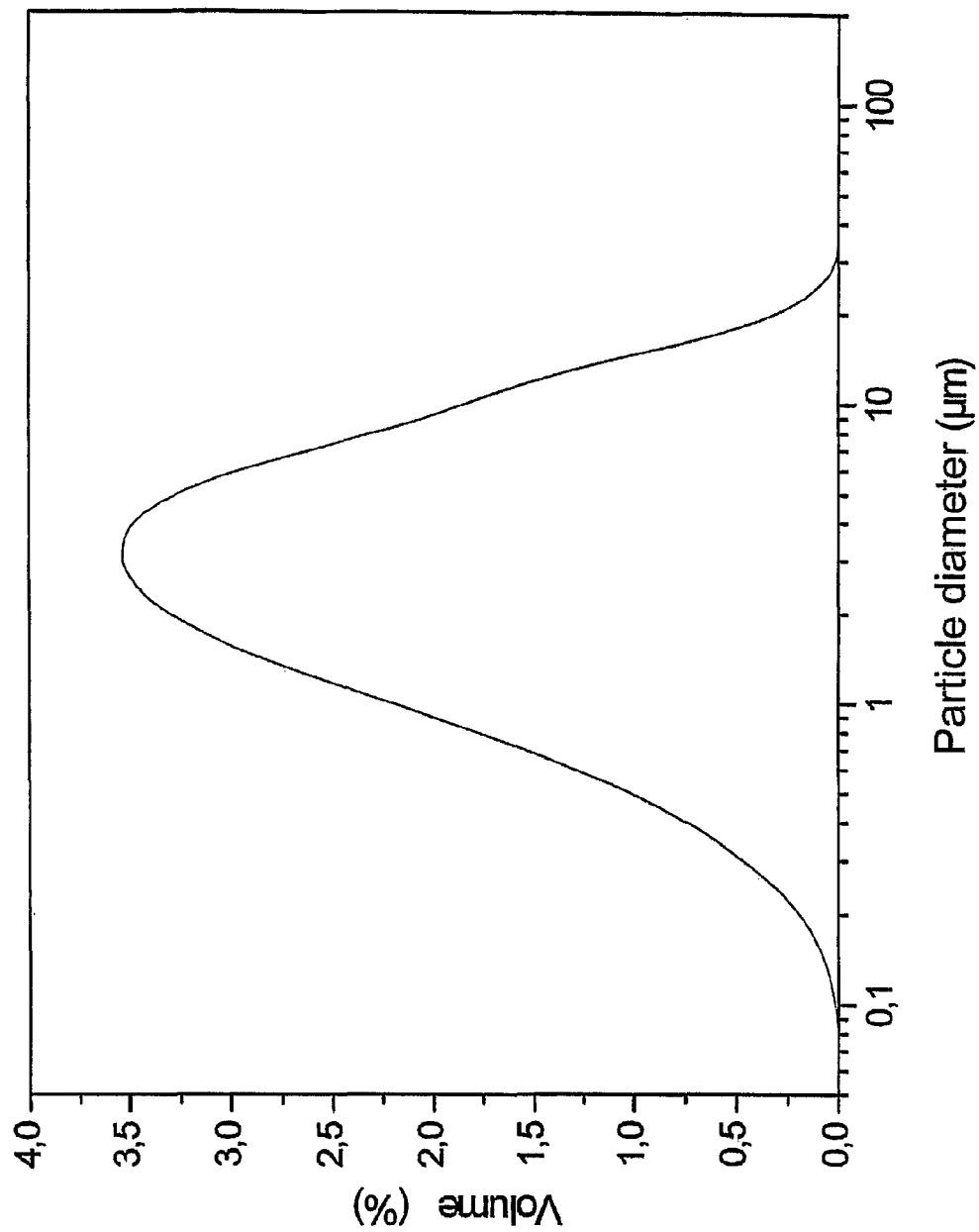

FIG. 12 pertains to the analysis by laser dispersion technique of the distribution of sizes of the disperse phase of the suspension obtained in Example 3.

Figure 13:
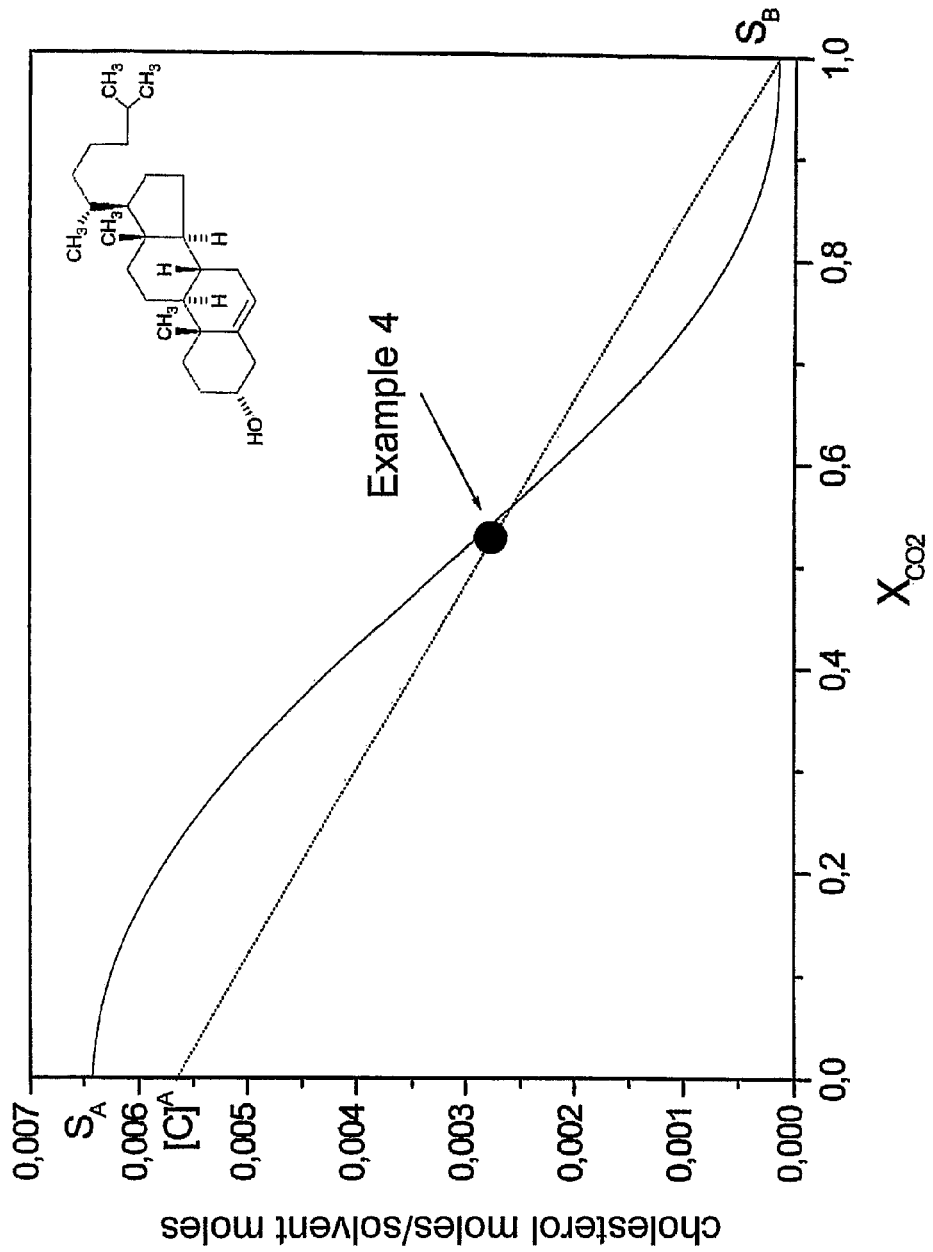

FIG. 13 shows the composition of the "cholesterol-acetone-$CO_2$" mixture at 100 bars and 35° C. just before depressurisation, Example 4, in relation to the solubility curve of cholesterol in mixtures of acetone-$CO_2$ at 100 bars and 35° C. On adjusting the solubility curve shown in the Figure to Equation 1 the following values were obtained: $\alpha=0.1$; $\beta=1.9$.

Figure 14:
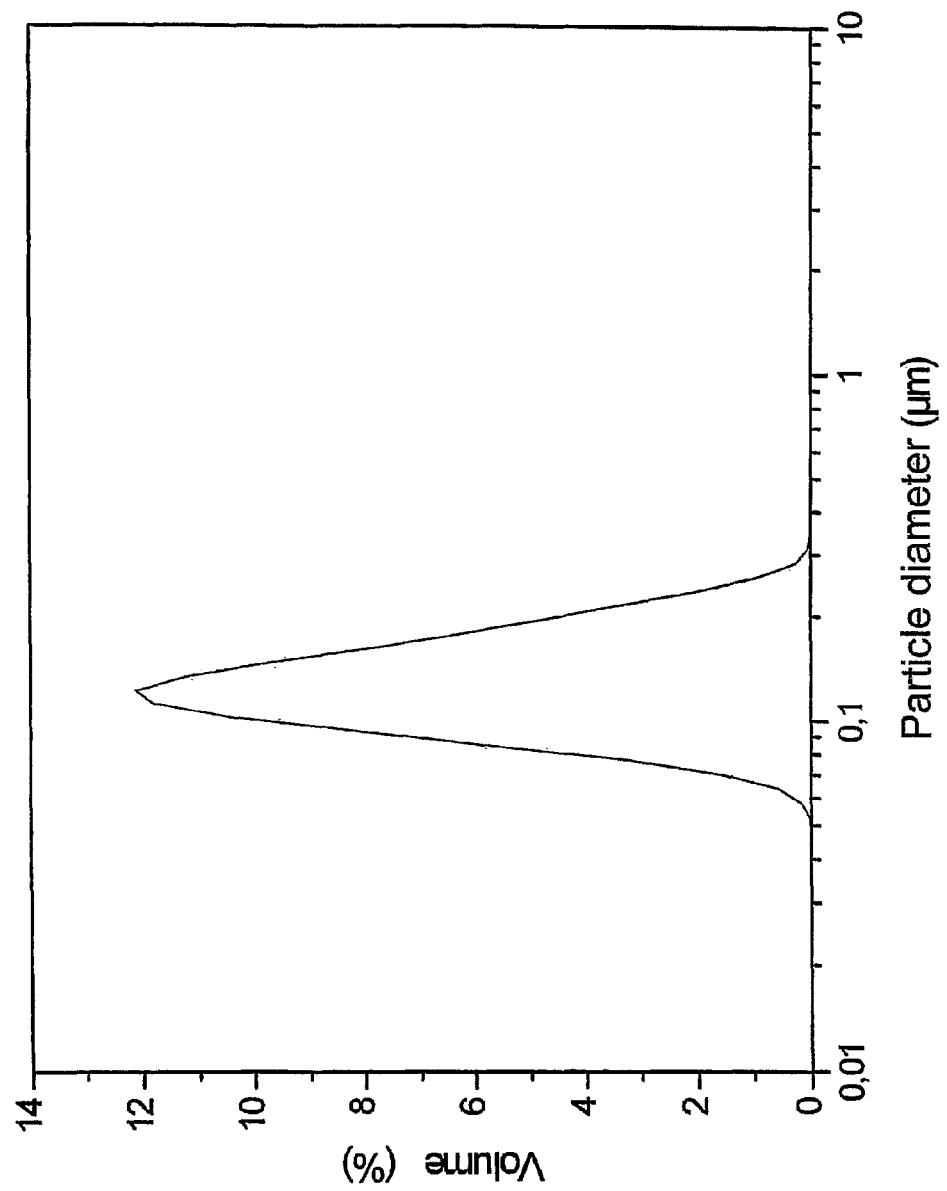

FIG. 14 pertains to the analysis by laser dispersion technique of the distribution of sizes of the disperse phase of the suspension obtained in Example 4.

Figure 15:
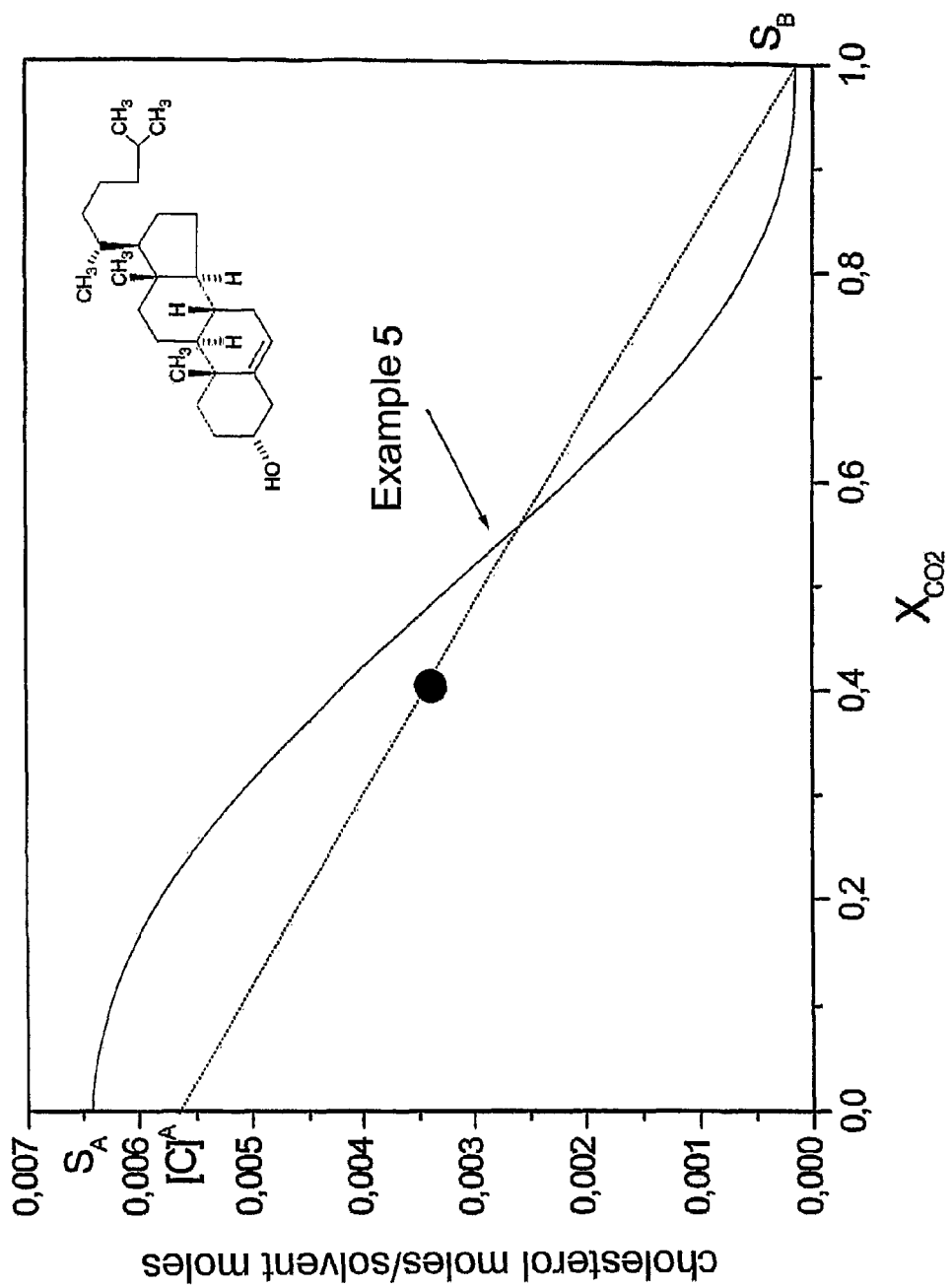

FIG. 15 shows the composition of the "cholesterol-acetone-$CO_2$" mixture at 100 bars and 35° C. just before depressurisation, Example 5, in relation to the solubility curve of cholesterol in mixtures of acetone-$CO_2$ at 100 bars and 35° C. On adjusting the solubility curve shown in the Figure to Equation 1 the following values were obtained: $\alpha=0.1$; $\beta=1.9$.

Figure 16:
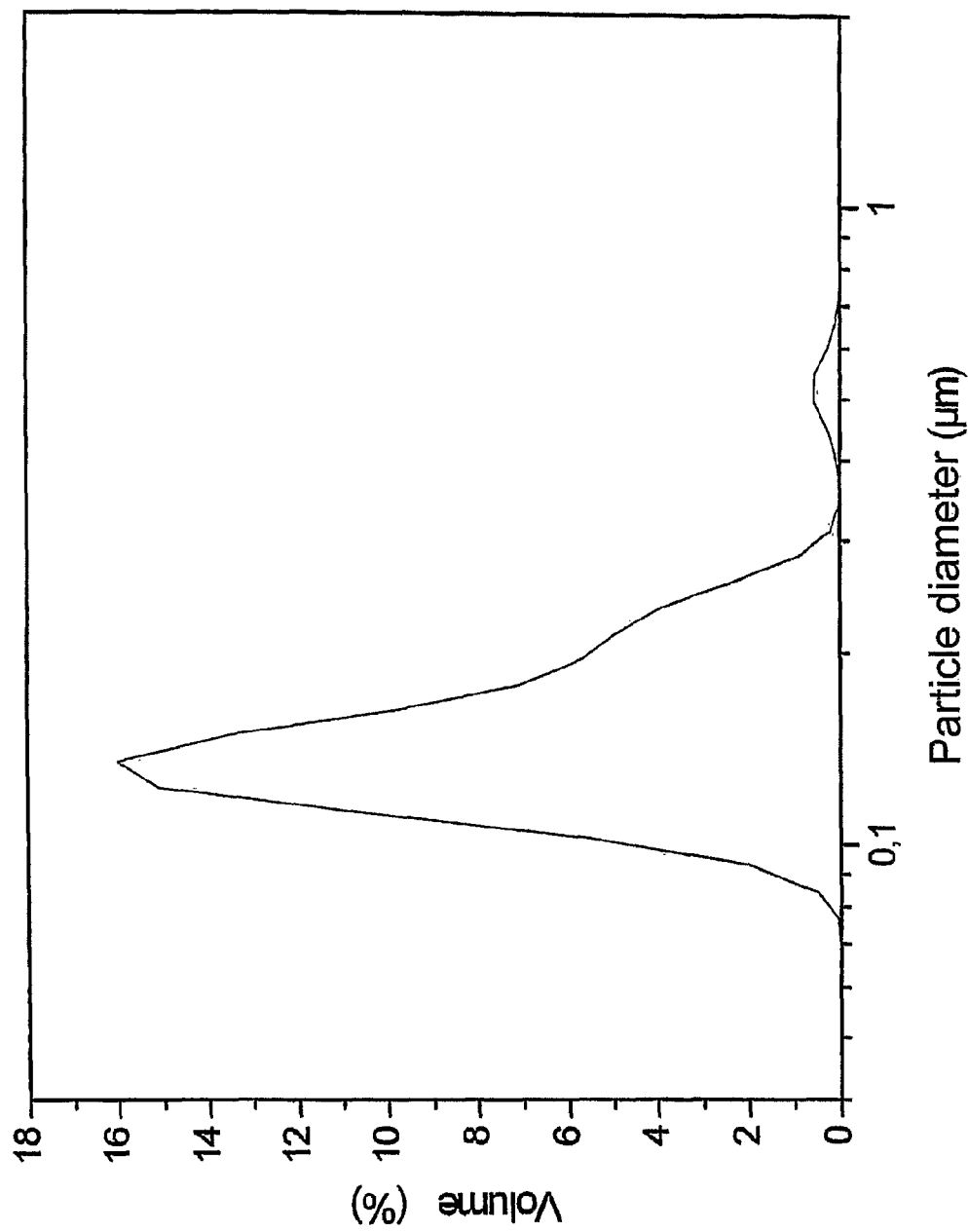

FIG. 16 pertains to the analysis by laser dispersion technique of the distribution of sizes of the disperse phase of the suspension obtained in Example 5.

Figure 17:
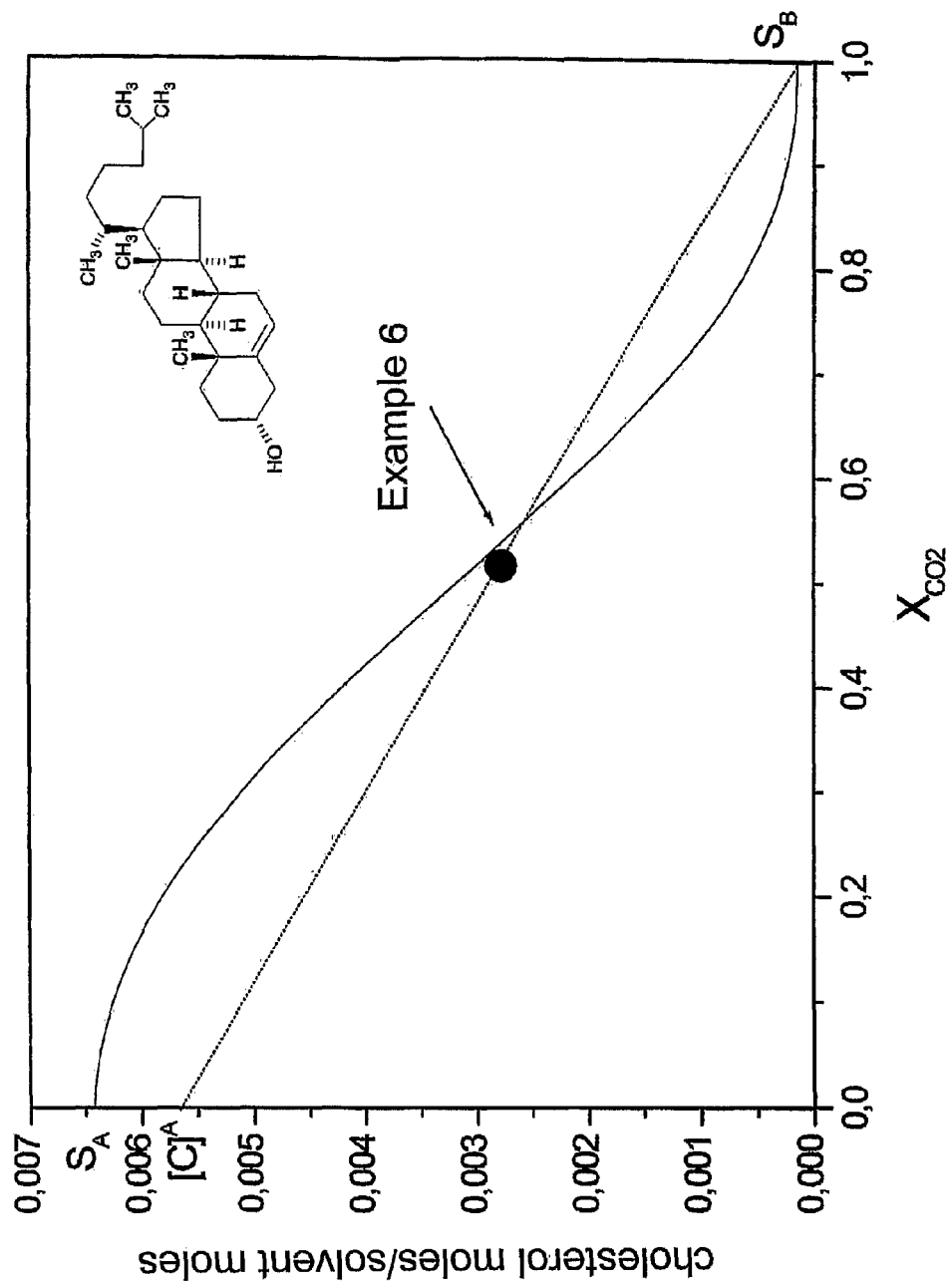

FIG. 17 shows the composition of the "cholesterol-acetone-$CO_2$" mixture at 100 bars and 35° C. just before depressurisation, Example 6, in relation to the solubility curve of cholesterol in mixtures of acetone-$CO_2$ at 100 bars and 35° C. On adjusting the solubility curve shown in the Figure to Equation 1 the following values were obtained: $\alpha=0.1$; $\beta=1.9$.

Figure 18:
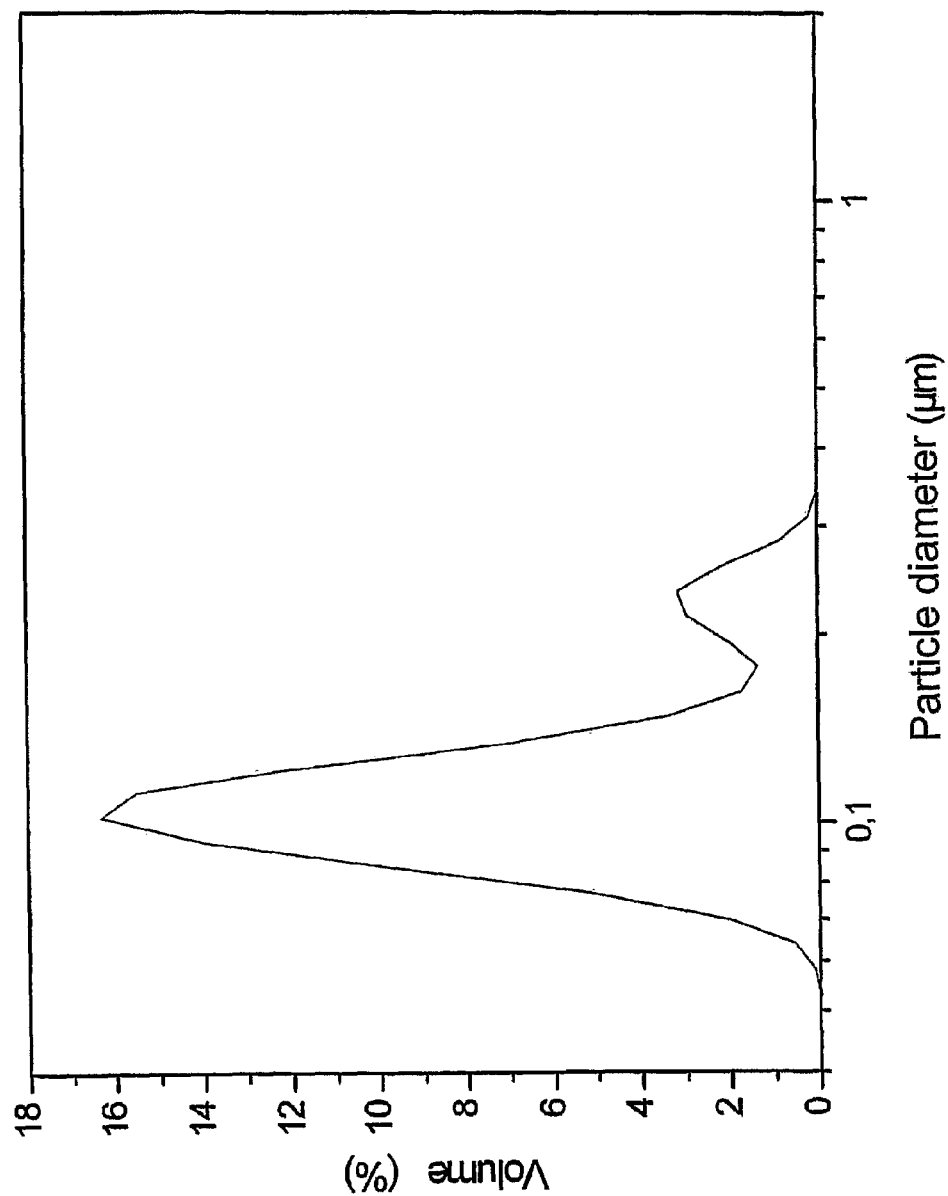

FIG. 18 pertains to the analysis by laser dispersion technique of the distribution of sizes of the disperse phase of the suspension obtained in Example 6.

FIG. 19 pertains to the analysis by laser dispersion technique of the distribution of sizes of the disperse phase of the suspension obtained in Example 7.

PREFERRED EMBODIMENT OF THE PRESENT INVENTION

A detailed description is provided below of a preferred embodiment of the method of the invention implemented on the equipment shown in schematic form in FIG. 6.

1. Placement in the mixing reactor 7, at a temperature T, of a certain amount ($V_i$) of a mixture AC of the compound C in a fluid A, with fluid A being a polar or apolar solvent or a mixture of both, such as acetone, water, methanol, ethanol, ethyl acetate, toluene, etc. Fluid A preferably contains one or more additives, such as polysorbates, CTAB, AOT, PEGs, lecithin, ascorbil palmitate, together with other ionic or non-ionic surfactants.

2. Formation in the reactor 7 of a liquid solution AB, at pressure P and temperature T, by adding mixture AC to a liquid or supercritical fluid B, such as $CO_2$, ethane, propane, hydrochlorofluorocarbons (e.g. HCFC-2) or hydrofluorocarbons (e.g. HCF-134A), which are gases at atmospheric pressure and are miscible with fluid A at pressure P. The addition of fluid B is carried out using the pump 3, or through the bottom part of the reactor 7 by keeping valves 4 and 5 open and all the others closed, or through the top part of the reactor 7 by keeping valves 4 and 6 open and all the others closed. Addition ends when pressure P has been achieved in the reactor 7.

3. Opening of the valve 10, in order to establish connection between the reactor 7 and the filter 11, which had previously been pressurised to pressure P, keeping all the other valves closed.

4. Gradual opening of valve 12, with resulting depressurisation of solution AB. Pressure P inside the reactor 7 is kept constant by constant addition of $N_2$ through valves 9 and 6. The depressurised mixture is continuous-process mixed with a fluid E, with fluid E being water or an organic solvent or mixtures thereof, generally water. Fluid E, which may or may not contain additives, is supplied to the system via the pump 13. A filtration at pressure P is carried out in the filter 11, and any precipitate formed during mixing of mixture AC with fluid B is collected. The dispersion obtained is collected in receptacle 15.

5. Once depressurisation of solution AB has been completed, the entire equipment is depressurised through valve 12.

EXAMPLES

Example 1

Obtaining a nanosuspension of cholesterol in water by the method of the invention. (In the presence of Tween 80 surfactant in the initial fluid E, in this example water).

1240 mL of a solution of the compound cholesterol in acetone with a concentration of 90% relative to saturation is placed in a mixing reactor 7 of 2L capacity. To this solution $CO_2$ is added at a flow of 7 kg/h until the pressure of the reactor 7 reaches 100 bar. The temperature is kept constant at 35° C. throughout the entire process. The new cholesterol-acetone-$CO_2$ mixture is left to stabilise at 100 bar and 35° C. for 10 minutes (see FIG. 7). The $CO_2$ supply is cut off and the addition of $N_2$ commenced through the top part of the reactor through valve 6, keeping the pressure and temperature constant. Depressurisation of the solution, with consequent rapid evaporation of the $CO_2$ and sudden cooling of the solution, homogeneously at all points thereof, takes place when valve 12 is opened. This large, sudden and extremely homogeneous temperature drop causes precipitation of the cholesterol in the form of finely divided particles, which are left suspended in the depressurised mixture. As FIG. 6 shows, the depressurised mixture is mixed continuously with a flow of 1.5 L/min of water containing 1% by weight of Tween 80 surfactant, providing a nanosuspension of cholesterol in water that is collected in the collector 15. The distribution of particle sizes, in % by volume, of the solid phase of the suspension obtained shows an average of 0.3 µm, with a standard deviation of 0.2 µm (see FIG. 8). 9% of the solid has a particle diameter of less than 0.1 µm, 90% of the precipitate is less than 0.50 µm and 98.8% less than 1 µm. The suspension obtained is stable in accordance with the method described in the Ullmann encyclopaedia (4th Edition, 2, 205), which deems a dispersion stable if no phase separation is observed when it is submitted to centrifuging at 300 rpm for 30 minutes. The yield of the process is 76%.

Example 2

Obtaining a nanosuspension of Solvent Blue 35 colorant in water by the method of the invention. (In the presence of Tween 80 surfactant in the initial fluid E, in this example water).

Figure 6:
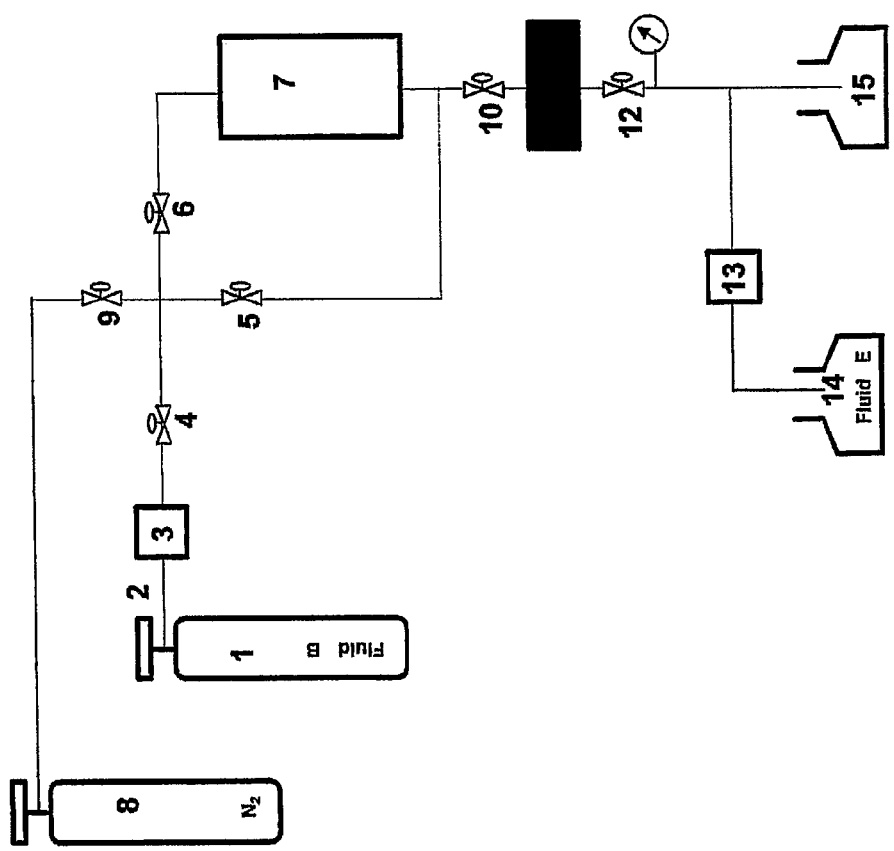
FIG. 6 shows an installation for carrying out the method of the invention. This equipment includes a tank 1 that contains the fluid B, connected to a pump 3 that supplies said fluid at high pressure. The addition of fluid B to the mixing reactor 7 containing mixture AC can be carried out at the top part through the values 4 and 6, or at the bottom part through values 4 and 5. Value 9 controls the addition to the mixing reactor 7 of an inert gas that is in a tank 8. The mixture at pressure P passes to the filter 11 through value 10, where a first filtering is carried out at pressure P.

590 mL of a solution of the colorant "solvent blue 35" in acetone with a concentration of 80% relative to saturation is placed in a mixing reactor 7 of 2L capacity, of the configuration shown schematically in FIG. 6. To this solution $CO_2$ is added at a flow of 7 kg/h until the pressure of the reactor 7 reaches 100 bar. The temperature is kept constant at 2500 throughout the entire process. The new "solvent blue 35"-acetone-$CO_2$ mixture is left to stabilise at 100 bar and 25° C. for 10 minutes (see FIG. 9). The $CO_2$ supply is cut off and the addition of $N_2$ commenced through the top part of the reactor through valve 6, keeping the pressure and temperature constant. Depressurisation of the solution, with consequent rapid evaporation of the $CO_2$ and sudden cooling of the solution, homogeneously at all points thereof, takes place when valve 12 is opened. This large, sudden and extremely homogeneous temperature drop causes precipitation of the solvent blue 35 colorant in the form of finely divided particles, which are left suspended in the depressurised mixture. As FIG. 6 shows, the depressurised mixture is mixed continuously with a flow of 1.5 L/min of water that contains 1% by weight of Tween 80 surfactant, providing a nanosuspension of solvent blue 35 colorant in water that is collected in the collector 15. The distribution of particle sizes, in % by volume, of the solid phase of the suspension obtained shows an average of 0.8 µm, with a standard deviation of 0.9 µm (see FIG. 10). 65.4% of the precipitate has a particle diameter of less than 1 µm and 90% of less than 2.0 µm. The suspension obtained was stable in accordance with the method described in the Ullmann encyclopaedia, which deems a dispersion stable if no phase separation is observed when it is submitted to centrifuging at 300 rpm for 30 minutes. The yield of the process is 87%.

Example 3

Obtaining a microsuspension of Solvent Blue 35 colorant in water by the method of the invention. Starting with an initial mixture AC in suspension form.

This Example illustrates the obtaining of a suspension by the method of the invention, in which the initial concentration of Compound C in the mixture AC $[C]^4$ exceeds $S^4$.

1636 mL of a suspension of "Solvent blue 35" colorant in acetone with a concentration of 114% relative to saturation is placed in a mixing reactor 7 of 2L capacity, of the configuration shown schematically in FIG. 6. To this solution $CO_2$ is added with a flow of 7 kg/h until the pressure of the reactor 7 reaches 100 bar. The temperature is kept constant at 25° C. throughout the entire process. The new "solvent blue 35"-acetone-$CO_2$ mixture is left to stabilise at 100 bar and 25° C. for 10 minutes (see FIG. 11). The $CO_2$ supply is cut off and the addition of $N_2$ commenced through the top part of the reactor through valve 6, keeping the pressure and temperature constant. Depressurisation of the solution, with consequent rapid evaporation of the $CO_2$ and sudden cooling of the solution, homogeneously at all points thereof, takes place when valve 12 is opened. This large, sudden and extremely homogeneous temperature drop causes precipitation of the solvent blue 35 colorant in the form of finely divided particles, which are left suspended in the depressurised mixture. As FIG. 6 shows, the depressurised mixture is mixed continuously with a flow of 1.5 L/min of water that contains 1% by weight of Tween 80 surfactant, providing a nanosuspension of solvent blue 35 colorant in water that is collected in the collector 15. The distribution of particle sizes, in % by volume, of the solid phase of the suspension obtained shows an average of 2.6 µm, with a standard deviation of 3.2 µm (see FIG. 12). 23% of the precipitate has a particle diameter of less than 1 µm and 90% of less than 9.1 µm. The suspension obtained was stable in accordance with the method described in the Ullmann encyclopaedia, which deems a dispersion stable if no phase separation is observed when it is submitted to centrifuging at 300 rpm for 30 minutes. The yield of the process is 80%.

Example 4

Obtaining a nanosuspension of cholesterol in water by the method the invention. (In the presence of CTAB surfactant in the initial fluid E, in this case water).

1240 mL at a solution of the compound cholesterol in acetone with a concentration of 90% relative to saturation is placed in a mixing reactor 7 of 2L capacity, of the configuration shown schematically in FIG. 6. To this solution $CO_2$ is added with a flow of 7 kg/h until the pressure of the reactor 7 reaches 100 bar. The temperature is kept constant at 35° C. throughout the entire process. The now cholesterol-acetone-$CO_2$ mixture is left to stabilise at 100 bar and 35° C. for 10 minutes (see FIG. 13). The $CO_2$ supply is cut of and the addition of $N_2$ commenced through the top part of the reactor through valve 6, keeping the pressure and temperature constant. Depressurisation of the solution, with consequent rapid evaporation at the $CO_2$ and sudden cooling of the solution, homogeneously at all points thereof, takes place when valve 12 is opened. This large, sudden and extremely homogeneous temperature drop causes precipitation of the cholesterol in the form of finely divided particles, which are left suspended in the depressurised mixture. As FIG. 6 shows, the depressurised mixture is mixed continuously with a flow of 1.5 L/min of water that contains 0.4% by weight of CTAB cationic surfactant, providing a nanosuspension of cholesterol in water that is collected in the collector 15. The distribution of particle sizes, in % by volume, of the solid, phase of the suspension obtained shows an average of 0.13 µm, with a standard deviation of 0.04 µm (see FIG. 14). 25% of the solid has a particle diameter of less than 0.1 µm, 75% of the precipitate of less than 0.16 µm and 90% of less than 0.2 µm. The suspension obtained was stable in accordance with the method described in the Ullmann encyclopaedia, which deems a dispersion stable if no phase separation is observed when it is submitted to centrifuging at 300 rpm for 30 minutes. The yield of the process is 75%.

Example 5

Obtaining a nanosuspension of cholesterol in water by the method of the invention. (In the presence of CTAB surfactant in the initial fluid E, in this case water, as in Example 4 but with a molar fraction of $CO_2$ in solution AB lower than in Example 4).

1550 mL of a solution of the compound cholesterol in acetone with a concentration of 90% relative to saturation is placed in a mixing reactor 7 of 2L capacity, of the configuration shown schematically. in the FIG. 6. To this solution $CO_2$ is added with a flow of 7 kg/h until the pressure of the reactor 7 reaches 100 bar. The temperature is kept constant at 35° C. throughout the entire process. The new cholesterol-acetone-$CO_2$ mixture in left to stabilise at 100 bar and 35° C. for 10 minutes (see FIG. 15). The $CO_2$ supply is cut off and the addition of $N_2$ commenced through the top part of the reactor through valve 6, keeping the pressure end temperature constant. Depressurisation of the solution, with consequent rapid evaporation of the $CO_2$ and sudden cooling of the solution, homogeneously at all points thereof, takes places when valve 12 is opened. This large, sudden and extremely homogeneous temperature drop causes precipitation of the cholesterol in the form of finely divided particles, which are left suspended in the depressurised mixture. As FIG. 6 shows, the depressurised mixture is mixed continuously with a flow of 1.5 L of water that contains 0.4% by weight of the cationic surfactant CTA, providing a nanosuspension of cholesterol in water that is collected in the collector 15. The distribution of particle sizes, in % by volume, of the solid phase of the suspension obtained shows an average of 0.13 µm, with a standard deviation of 0.07 µsee (FIG. 16). 22% of the solid has a particle diameter of less than 0.1 µm, 90% of the precipitate of less than 0.22 µm and 100 of less than 1 µm. The suspension obtained was stable in accordance with the method described in the Ullmann encyclopaedia, which deems a dispersion stable if no phase separation is observed when it is submitted to centrifuging at 300 rpm for 30 minutes. The yield of the process is 72%.

Example 6

Obtaining a nanosuspension of cholesterol in water by the method of the invention. (In the presence of CTAB surfactant both in the initial solution A, in this case cholesterol in acetone, and in the initial fluid E, in this case water).

1240 mL of a solution of the compound cholesterol in acetone with a concentration of 90% relative to saturation and with a concentration of 2% of CTAB surfactant is placed in a mixing reactor 7 of 2L capacity, of the configuration shown schematically in the FIG. 6. To this solution $CO_2$ is added with a flow of 7 kg/h until the pressure of the reactor 7 reaches 100 bar. The temperature is kept constant at 35° C. throughout the entire process. The new cholesterol-acetone-$CO_2$ mixture is left to stabilize at 100 bar and 35° C. for 10 minutes (see FIG. 17). The $CO_2$ supply is cut off and the addition of $N_2$ commenced through the top part of the reactor through valve 6, keeping the pressure and temperature constant. Depressurisation of the solution, with consequent rapid evaporation of the $CO_2$ and sudden cooling of the solution, homogeneously at all points thereof, takes place when valve 12 is opened. This large, sudden and extremely homogeneous temperature drop causes precipitation of the cholesterol in the form of finely divided particles, which are left suspended in the depressurised mixture. As FIG. 6 shows, the depressurised mixture is mixed continuously with a flow of 1.5 L/min of water that contains 0.4% by weight of the cationic surfactant CTAB, providing a nanosuspension of cholesterol in water that is collected in the collector 15. The distribution of particle sizes, in % by volume, of the solid phase of the suspension obtained shows an average of 0.1 μm, with a standard deviation of 0.05 μm (see FIG. 18). 48% of the solid has a particle diameter of less than 0.1 μm, 95% of the precipitate of less than 0.21 μand 100% of less than 1 μm. The suspension obtained was stable in accordance with the method described in the Ullmann encyclopaedia, which deems a dispersion stable if no phase separation is observed when it is submitted to centrifuging at 300 rpm for 30 minutes. The yield of the process is 60%.

Example 7

Obtaining nanosuspension of cholesterol in water. In the presence of CTAB surfactant in the initial fluid E, in this case water.

This example is equivalent to Example 5, although in this case instead of continuously mixing the depressurised system and the aqueous phase, downstream of the valve 12 the depressurised mixture is collected directly over the total aqueous phase that is in the collector 15.

1240 mL of a solution of the compound cholesterol in acetone with a concentration of 90% relative to saturation is placed in a mixing reactor 7 of 2L capacity, of the configuration shown schematically in FIG. 6. To this solution $CO_2$ is added with a flow of 7 kg/h until the pressure of the reactor 7 reaches 100 bar. The temperature is kept constant at 35° C. throughout the entire process. The new cholesterol-acetone-$CO_2$ mixture is left to stabilise at 100 bar and 35° C. for 10 minutes. The $CO_2$ supply is cut off and the addition of $N_2$ commenced through the top part of the reactor through valve 6, keeping the pressure and temperature constant. Depressurisation of the solution, with consequent rapid evaporation of the $CO_2$ and sudden cooling of the solution homogeneously at all points thereof, takes place when valve 12 is opened. This large, sudden and extremely homogeneous temperature drop causes precipitation of the cholesterol in the form of finely divided particles, which are left suspended in the depressurised mixture. Downstream of the valve 12, the depressurised mixture is collected in the collector 15, into which had previously been placed 11 liters of water containing 0.4% by weight, of the cationic surfactant CTAB, providing a nanosuspension of cholesterol in water.

The distribution of particle sizes, in % by volume, of the solid phase of the suspension obtained shows an average of 0.2 μm with a standard deviation of 2.9 μm (see FIG. 19). 19% of the solid has a particle diameter of less than 0.1 μm, 72% of the precipitate of less than 1 μm and 90% of less than 4.7 μm. The suspension obtained was stable in accordance with the method described in the Ullmann encyclopaedia, which deems a dispersion stable if no phase separation is observed when it is submitted to centrifuging at 300 rpm for 30 minutes. The yield of the process is 78%.

The invention claimed is:

1. A method for obtaining micro- and nanodisperse systems comprising the steps of:
    a) Dissolving or suspending a compound C in a fluid A, in order to obtain a mixture A in the form of a solution or dispersion;
    b) Thermostatising said mixture A at a temperature T of between −50° C. and 200° C.;
    c) Adding a fluid B to said mixture A until a pressure P to form a solution AB, wherein the pressure P is equal or lower than 100 bars;
    d) Reducing the pressure P of the solution AB to a pressure lower than 100 bars, giving rise to a fall in temperature caused by the evaporation of fluid B that is ideally homogeneous throughout the solution AB and that gives rise to an increase of supersaturation, such that the compound C separates out in a solid form or a liquid form of micro-, submicro- or nanoscopic size suspended in the depressurized mixture;
    e) Adding a fluid E, in which fluid A is miscible and compound C is partially or totally insoluble at atmospheric pressure, so that the addition of said fluid E interrupts the crystallization of compound C and thus the crystalline growth of the particles; and
    f) Removing the fluid A remaining in the dispersion of step (e) by separation;
    wherein the micro- and nanodisperse systems obtained are selected from liposomes, emulsions or suspensions;
    wherein compound C is partially or totally insoluble in fluid E, and capable of being dispersed in fluid E and fluid A; and
    wherein fluid E is a polar or an apolar solvent or mixture of both.

2. The method according to claim 1, wherein said fluid A contains solids in suspension.

3. The method according to claim 1, wherein fluid A and/or fluid E contain at least one additive.

4. The method according to claim 3, wherein said additive is selected from emulsifiers, ionic or non-ionic surfactant agents, surface agents, colloid stabilisers and protectors.

5. The method according to claim 3, wherein said additive is selected from among the polysorbates, polyethylene glycols (PEGs), poloxamer, ascorbil palmitate, lecithin, hexacetyltrimethylammonium bromide (CTAB) and dioctyl sodium sulphosuccinate (AOT).

6. The method according to claim 1, wherein said separation is carried out by means of evaporation.

7. The method according to claim 1, wherein said compound C is a solid or liquid substance or a mixture of substances partially or totally insoluble in fluid E and liable to be dispersed in said fluid E.

8. The method according to claim 1, wherein said compound C is selected from a drug, explosive, colorant, pigment, cosmetic, polymer, catalyst, chemical product for agriculture or other substance partially or totally insoluble in fluid E, and liable to be dispersed in fluid E.

9. The method according to claim 1, wherein said fluid A is a polar or apolar solvent or a mixture of both.

10. The method according to claim 1, wherein said fluid A is selected from between acetone, water, methanol, ethanol, ethyl acetate, toluene or mixtures thereof.

11. The method according to claim 1, wherein said fluid B is a liquid or supercritical fluid at said pressure P, a gas at atmospheric pressure and ambient temperature, and miscible with fluid A and mixture A or only with mixture A, whether it be a dispersion or solution, at said pressure P and at said temperature T, such that said solution AB is obtained.

12. The method according to claim 11, wherein said fluid B is selected from among $CO_2$, ethane, propane, hydrochlorofluorocarbons and hydrofluorocarbons.

13. The method according to claim 1, wherein during stage (d) an inert gas is added to the solution AB resulting from stage (c).

14. The method according to claim 1, wherein when the solution AB that includes the compound C is depressurised, the temperature drop undergone causes a decrease in the solubility of compound C in solvent A of at least one order of magnitude.

15. The method according to claim 1, wherein the solubility response of compound C in mixtures of fluid A and fluid B, at pressure P and temperature T, approximates to a mathematical function of the type:

$$S = S^A \cdot (1-X_B)^{(\alpha+\beta X_B)} + S^B X_B \qquad \text{Equation 1}$$

where

S is the solubility of compound C, expressed in moles of C per moles of solvent;

$X_B$ is the molar fraction of the fluid B in the solvent mixture (fluid A plus fluid B) at pressure P and temperature T;

$S^A$ is the solubility of compound C in fluid A;

$S^B$ is the solubility of compound C in fluid B;

where $\alpha<1$, $\beta>0$ and $|\beta/\alpha| \geqq 1$ are fulfilled simultaneously; or where $0 \leqq \alpha \leqq$ and $0 \leqq \beta \geqq$ are fulfilled simultaneously.

16. The method according to claim 1 wherein said mixture A is thermostatised at a temperature of between 10° C. and 70° C.

17. The method according to claim 1, wherein in said stage d) the pressure of solution AB is reduced to a pressure lower than or equal to 20 bars.

* * * * *